United States Patent
Kensrue

(10) Patent No.: US 7,271,366 B2
(45) Date of Patent: Sep. 18, 2007

(54) WELDING GUN CONTACT TIP

(75) Inventor: Milo M. Kensrue, Dana Point, CA (US)

(73) Assignee: M.K. Products, Inc., Irvine, CA (US)

( * ) Notice: Subject to any disclaimer, the term of this patent is extended or adjusted under 35 U.S.C. 154(b) by 143 days.

(21) Appl. No.: 11/086,200

(22) Filed: Mar. 22, 2005

(65) Prior Publication Data

US 2005/0230373 A1   Oct. 20, 2005

Related U.S. Application Data

(60) Provisional application No. 60/559,564, filed on Apr. 5, 2004.

(51) Int. Cl.
*B23K 9/28* (2006.01)
(52) U.S. Cl. .................................. 219/137.61
(58) Field of Classification Search ............ 219/137.61
See application file for complete search history.

(56) References Cited

U.S. PATENT DOCUMENTS

| | | | |
|---|---|---|---|
| 2,289,938 A | 7/1942 | Smith | |
| 2,315,358 A | 3/1943 | Smith | |
| 2,347,646 A | 5/1944 | Smith | |
| 2,379,470 A | 7/1945 | Baird | |
| 3,142,746 A * | 7/1964 | Schmerling | ............ 219/137.61 |
| 3,165,662 A | 1/1965 | Norris | |
| 3,204,080 A | 8/1965 | Spencer | |
| 4,575,612 A * | 3/1986 | Prunier | .................. 219/137.43 |
| 4,733,052 A | 3/1988 | Nilsson et al. | |
| 5,635,091 A * | 6/1997 | Hori et al. | ............. 219/137.61 |
| 6,559,416 B1 | 5/2003 | Steenis et al. | |
| 6,710,300 B2 | 3/2004 | Steenis et al. | |
| 2003/0209530 A1 | 11/2003 | Stuart et al. | |

FOREIGN PATENT DOCUMENTS

| | | | |
|---|---|---|---|
| DE | 33 40 191 | * | 5/1985 |
| EP | 0042 311 A1 | | 12/1981 |
| JP | 61-182886 | * | 8/1986 |
| JP | 11-123559 | * | 5/1999 |
| WO | WO 03/039800 | * | 5/2003 |
| WO | WO 03/039800 A1 | | 5/2003 |

* cited by examiner

*Primary Examiner*—Kevin P. Kerns
(74) *Attorney, Agent, or Firm*—Knobbe Martens Olson & Bear LLP

(57) ABSTRACT

A contact tip for a welding gun includes an elongate body having a first end, a second end, and a first opening extending longitudinally between the first end and the second end. The elongate body has an outer surface and an inner surface. The elongate body has a second opening extending radially through a side portion of the elongate body between the outer surface and the inner surface. At least a portion of the second opening is configured to support a contact element. A contact element is configured to be supported within at least a portion of the second opening of the elongate body and extend at least partially into the first opening of the elongate body. A retention member is configured to couple the contact element with the elongate body.

25 Claims, 20 Drawing Sheets

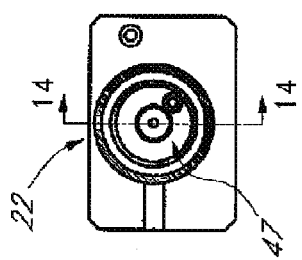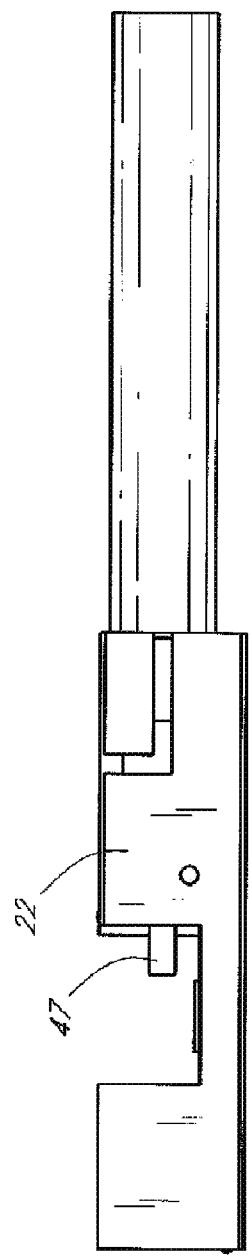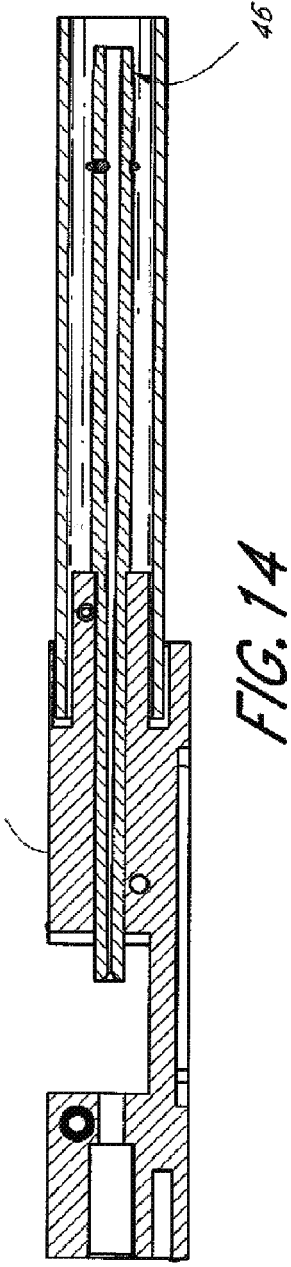

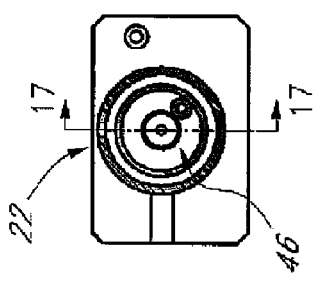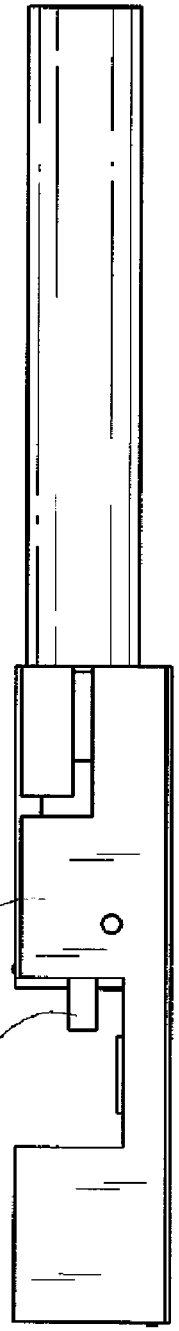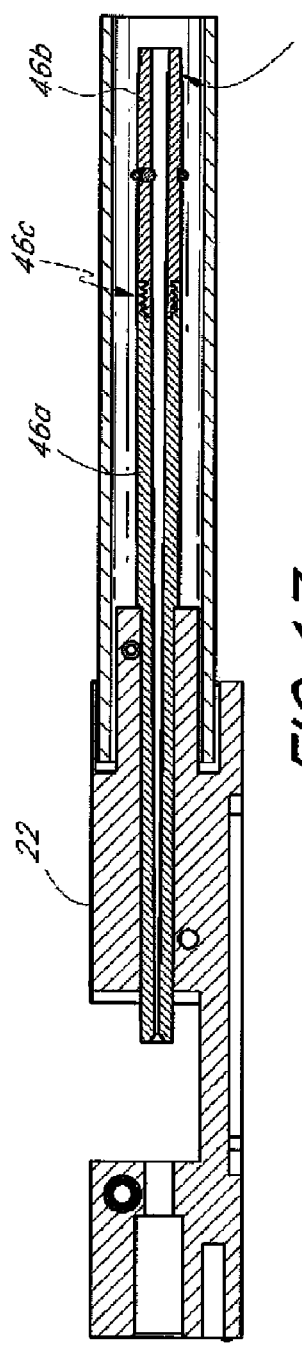

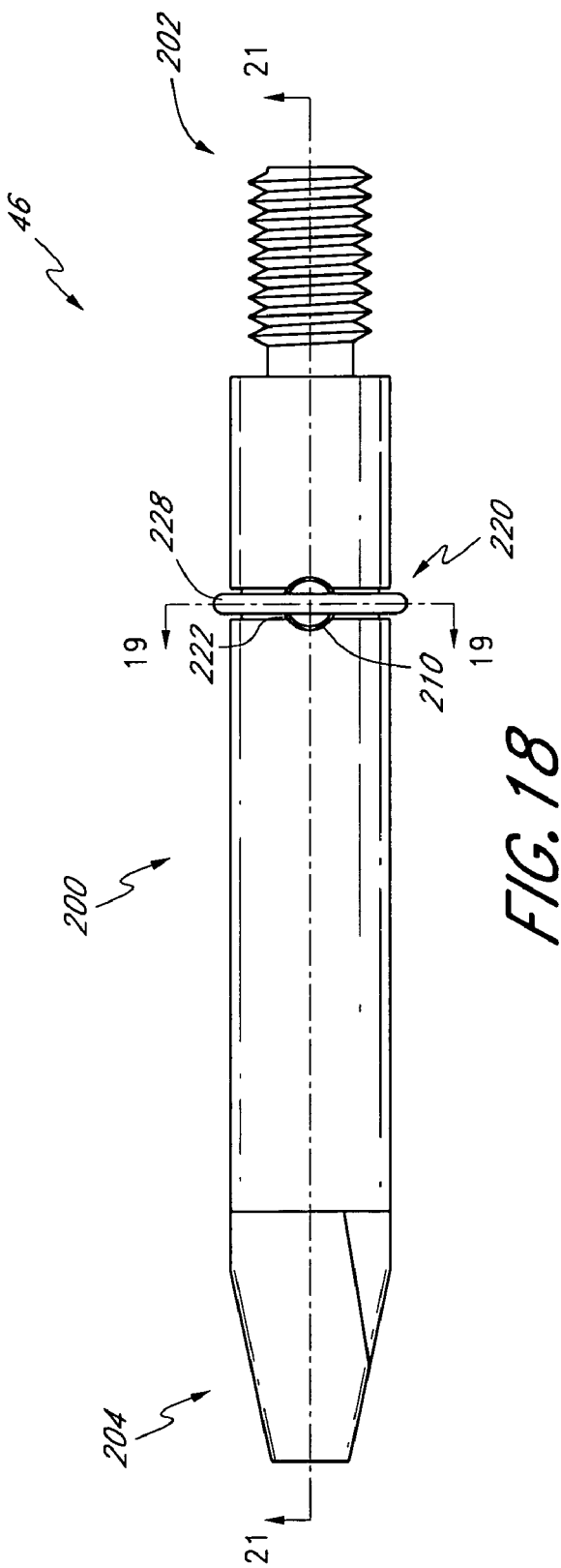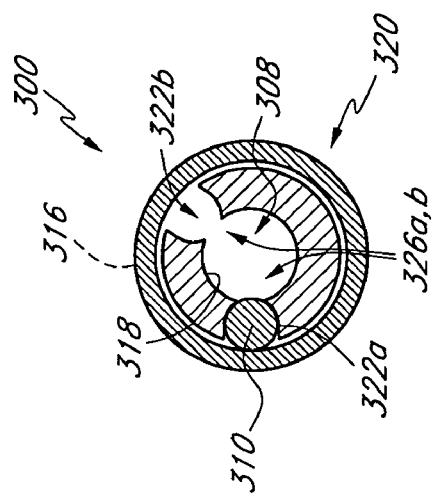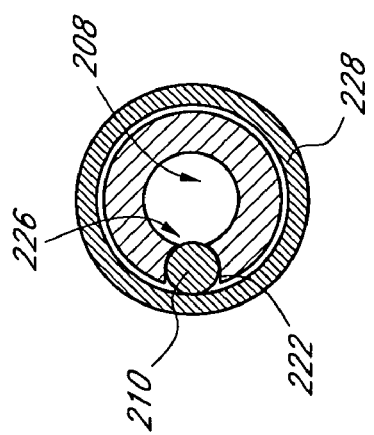

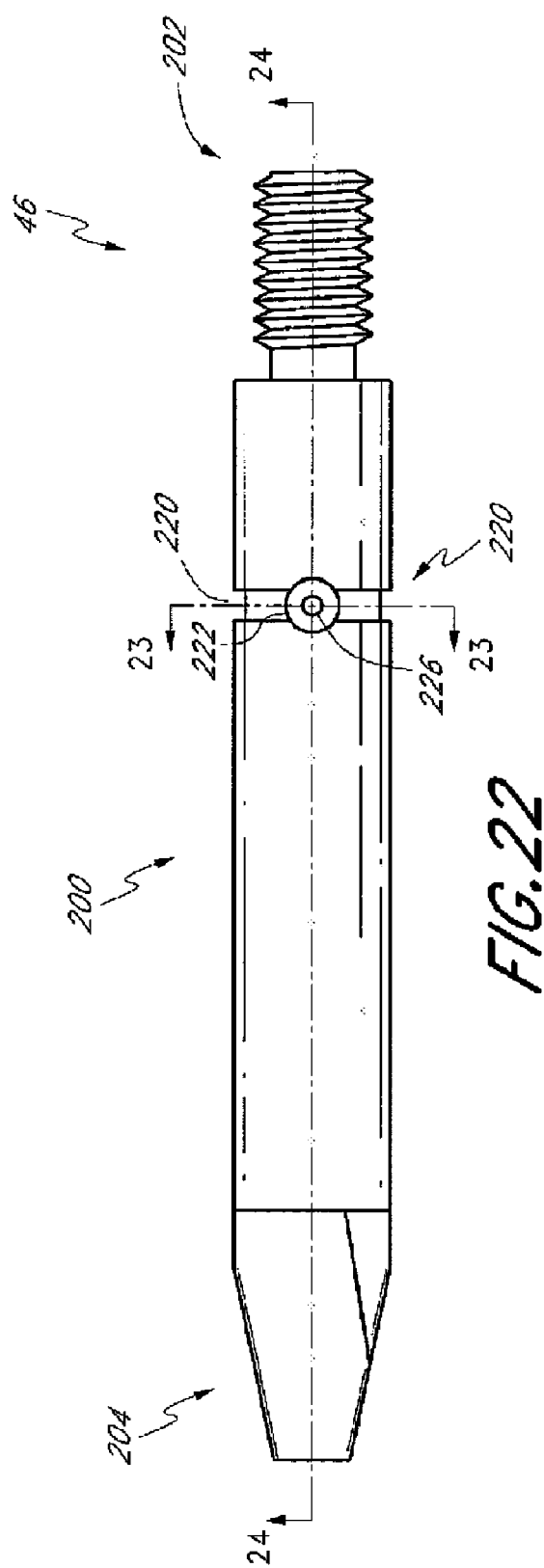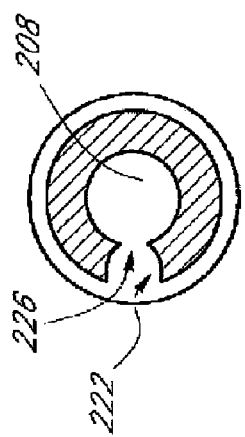

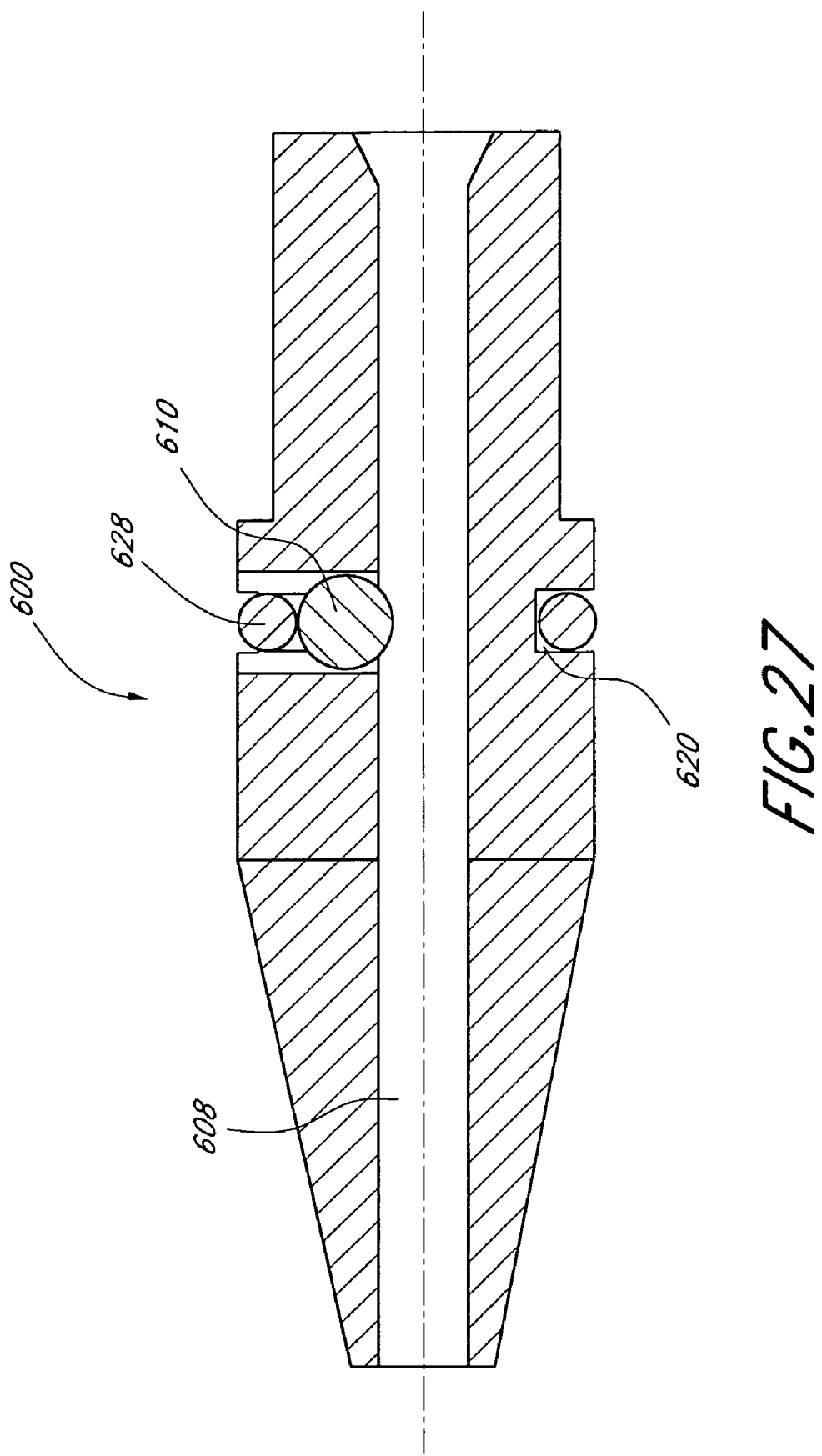

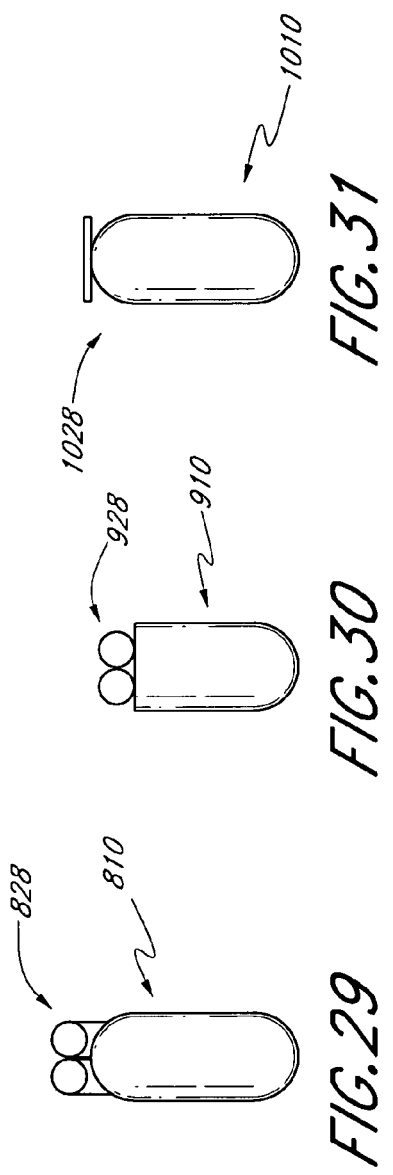
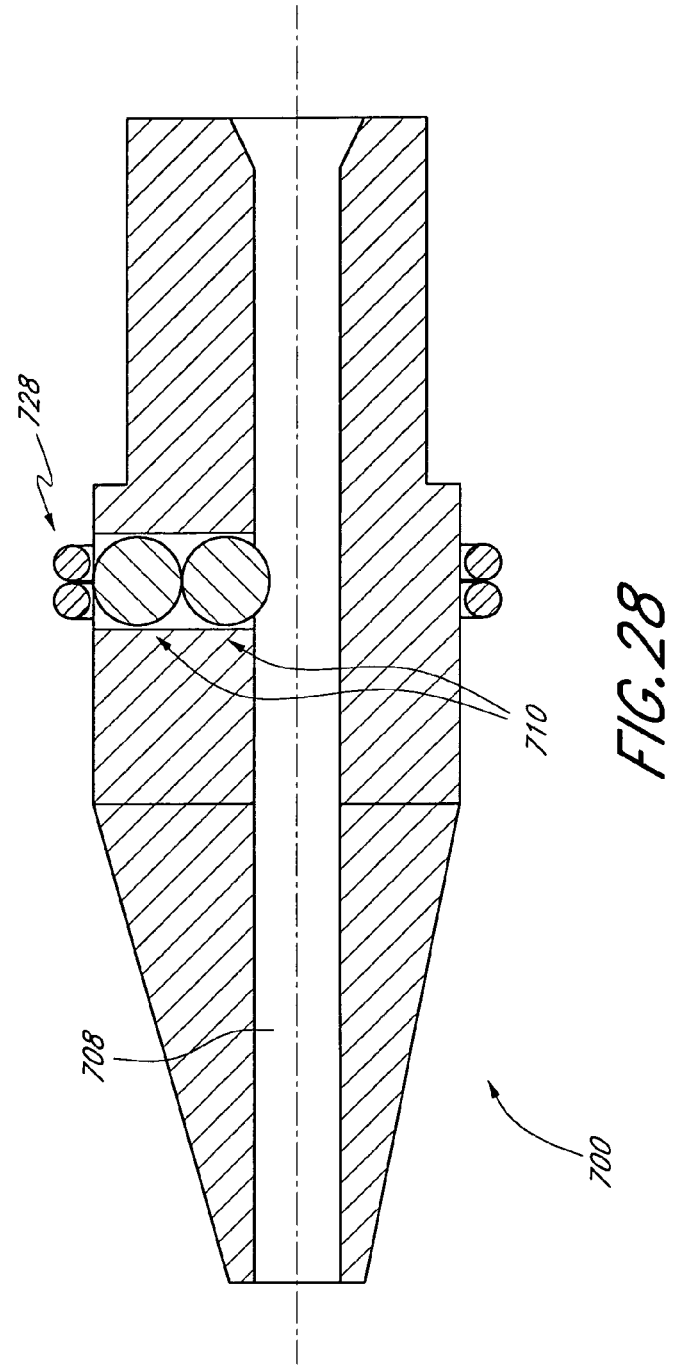

WELDING GUN CONTACT TIP

PRIORITY INFORMATION

This application is based on and claims priority to U.S. Provisional Patent Application No. 60/559,564 (filed Apr. 5, 2004), the entire contents of which are hereby expressly incorporated by reference herein and made a part of this specification.

BACKGROUND OF THE INVENTION

1. Field of the Invention

This invention relates to welding guns and contact tips for welding guns and, in particular, to a MIG welding gun with a contact tip.

2. Description of the Related Art

A metal inert gas (MIG) welding gun generally comprises a handle, a wire feed mechanism, and a torch barrel. A push-pull MIG welding gun can also include a motor. The welding gun typically also includes a gas tube and a cooling fluid tube for supplying gas and cooling fluid to the tip of the torch barrel. There are three general types of welding guns: pistol grip, goose neck and in-line welding guns. In a pistol grip gun, a motor can be located below a wire feed mechanism and can lie along an axis that lies generally perpendicular to the longitudinal axis of the gun. In contrast, in an in-line gun, a motor can lie along the longitudinal axis of the gun and is positioned generally behind the wire feed mechanism.

In MIG welding, the welding gun typically has a contact tip that preferably performs two functions. First, it accurately guides a weld wire to the point of contact with the workpiece. Second, it conducts adequate current, which may be as high as 400 amps or more, to the weld wire. A MIG gun has an electrical hot wire at the tip. To achieve the two functions of a MIG gun, a relatively long contact tip made of copper can be provided.

The contact tip can have an axially extending hole or bore provided therethrough. The hole preferably is sized slightly larger than the diameter of the weld wire. The contact tip can be coupled to and extend from a gas diffuser. An inert gas can be directed around the welding arc through the gas diffuser. Current can be supplied to the contact tip from the power block through the barrel or the gas diffuser.

Contact tips are particularly subject to at least two modes of failure. The first is burnback, which occurs if the feeding of weld wire through the contact tip is stopped while an arc is maintained, thus melting the wire back towards the end of the tip and gun. The loss of wire contact, wire diameter, alloy type, thermal expansion of wire and energy input may affect burnback. The second mode of failure is wearing of the through hole due to the abrasive nature of the weld wire material. In addition, because the contact tip is so close to the welding arc, and because the tip may carry high electrical currents, it may become very hot. The high temperatures also have a deleterious effect on the contact tip, due in part because the hotter the tip becomes the softer it becomes, which makes it less resistant to wear from the weld wire.

Due to the severe operating conditions, contact tips have relatively short service lives. Consequently, they are treated as consumable items in the industry. Typically, a contact tip is made as a separate piece that can be threaded into a gas diffuser. When a contact tip has worn, it is removed from the gas diffuser and discarded. A new contact tip is then coupled to the welding gun.

Removing a worn contact tip from the gas diffuser can require several turns of the contact tip. If the weld wire has burned back and fused to the contact tip, the weld wire is typically required to twist through the same number of turns as the contact tip. The potential springback of the fully removed contact tip due to the twisted weld wire is annoying if not potentially dangerous. Moreover, the time required to disassemble the contact tip also contributes to downtime of the welding production area. Newer pulsed and adaptive computer programs can monitor the current flowing through the contact tip to provide feedback or rapid (e.g., instantaneous) adjustment regarding the consistency of the contact. Providing a contact tip that has consistent contact can reduce failures and make the entire system more cost effective.

As stated above, a contact tip preferably conducts adequate current to the weld wire. In order for current to flow from the contact tip to the weld wire, the weld wire preferably remains in contact with the contact tip. However, as described above, the hole in the contact tip preferably is sized slightly larger than the diameter of the weld wire. Accordingly, in some cases the size of the hole may start out too large and contact between the weld contact tip and the weld wire is not continuously maintained. Depending on the size of the weld wire and the size of the hole, the weld wire generally comes in and out of contact with the contact tip during the welding process at totally random intervals and durations. When contact with the contact tip is lost, the contact tip ceases to transfer current to the wire. Even a momentary loss of current through the weld wire is undesirable. Where current has not been adequately maintained, leading to irregularities in the weld, workers may be required to cut out a section of a poor weld or x-ray the weld to ensure adequacy. This can require a large number of hours and can become very expensive.

Reducing the size of the hole to minimize the loss of contact can also provide significant problems. For example, the size or dimensions of the weld wire may vary somewhat due to manufacturing tolerances or thermal expansion. When the hole is too small, the weld wire can become lodged in the contact tip. If the weld wire becomes lodged in the contact tip it may fuse with the contact tip. As stated above, burnback can cause the contact tip to fail if the feeding of weld wire through the contact tip is stopped while an arc is maintained.

Some contact tips provide a radial opening for receiving a clamping ball and a tubular stainless steel split clip to hold the clamping ball against the weld wire to maintain contact between the weld wire and a side of the contact tip hole.

SUMMARY OF THE INVENTION

It would be advantageous to provide a welding gun with a contact tip that increases the amount of contact between the contact tip and the weld wire to provide a more consistent flow of current to the weld wire while reducing the likelihood that the weld wire would become lodged in the contact tip causing failure. In some embodiments, a contact tip provides an opening for a contact element and a retention member to hold the contact element against a weld wire to maintain contact between the weld wire and a side of the contact tip hole.

In some embodiments the retention member is easy to manufacture, simple to assemble, and cost effective. The retention member can be sized to reduce costs associated with manufacturing the contact tip and/or the retention member. In some embodiments the retention member is sized to function with contact tips of different sizes. In some embodiments the retention member is sized, shaped and/or configured to avoid overheating and provide a consistent amount of force. The retention member can comprise one or more materials that are advantageously suitable for tolerating heat and/or providing increased force control and better fit under operating conditions.

According to one embodiment of the invention, a contact tip for a welding gun comprises an elongate body having a first end, a second end, an outer surface, and an inner surface defining a first opening extending longitudinally between the first end and the second end. The first opening is configured to receive a weld wire. A second opening communicates with the first opening. The second opening extends between the outer surface and the inner surface. The second opening is configured to receive a contact element. A contact element is configured to be simultaneously positioned at least partially within the second opening and at least partially within the first opening. A retention member is configured to couple the contact element with the elongate body. The retention member has a generally circular cross-sectional shape.

According to another embodiment of the invention, a contact tip for a welding gun comprises an elongate body having a first end, a second end, an outer surface, and an inner surface defining a first opening extending longitudinally between the first end and the second end. The first opening is configured to receive a weld wire. A second opening communicates with the first opening. The second opening extends between the outer surface and the inner surface. The second opening is configured to receive a contact element. A contact element is configured to be simultaneously positioned at least partially within the second opening and at least partially within the first opening. A retention member is configured to couple the contact element with the elongate body. The retention member comprises an elastic material.

According to another embodiment of the invention, a contact tip for a welding gun comprises an elongate body having a first end and a second end. The elongate body has an outer surface and an inner surface. The inner surface defines a first opening extending longitudinally between the first end and the second end. The elongate body has a second opening extending through the elongate body between the outer surface and the inner surface. The second opening preferably extends radially through a side portion of the elongate body. At least a portion of the second opening is configured to support a contact element. A groove is defined in the elongate body. A contact element is configured to be supported within at least a portion of the second opening of the elongate body and extend at least partially into the first opening of the elongate body. A retention member is configured to couple the contact element with the elongate body. The retention member is configured to be self-centering within the groove over the second opening for directing a retention force on the weld wire. The retention force is transverse to and, preferably, at a right angle to the surface of the weld wire.

According to another embodiment of the invention, a contact tip comprises an elongate body. The elongate body has a generally cylindrical shape. The elongate body has a first end and a second end. The first end is configured to be coupled to a diffuser. The second end is configured to guide a weld wire. A first opening extends longitudinally through the elongate body between the first end and the second end. The elongate body has an outer surface and an inner surface. A groove is defined in the outer surface of the elongate body. A slot is located at least partially within the groove, and extends into a side portion of the elongate body further than the groove extends. A second opening is defined in the elongate body between the outer surface and the inner surface. The slot defines at least a portion of the second opening. The slot is configured to support a generally spherical contact element. The second opening is configured to allow the generally spherical contact element to extend at least partially into the first opening of the elongate body. The groove is configured to support a flexible member extending circumferentially about the elongate body and the generally spherical contact element. The contact tip comprises a generally spherical contact element configured to be coupled with the elongate body such that the generally spherical contact element is capable of being supported in the generally circular slot and extending at least partially through the second opening into the first opening. The contact tip comprises a flexible member configured to be coupled with the elongate body and the generally spherical contact element, the flexible member capable of extending circumferentially about the elongate body and the generally spherical contact element.

BRIEF DESCRIPTION OF THE DRAWINGS

FIG. 12 is a view of another embodiment of a contact tip and a portion of a weld gun.

FIG. 13 is a side view of the contact tip and portion of the weld gun of FIG. 12.

FIG. 14 is a cross-sectional view of the contact tip and portion of the weld gun taken along line 14-14 of FIG. 12.

FIG. 15 is a view of another embodiment of a contact tip and a portion of a weld gun.

FIG. 16 is a side view of the contact tip and portion of the weld gun of FIG. 15.

FIG. 17 is a cross-sectional view of the contact tip and portion of the weld gun taken along line 17-17 of FIG. 15.

FIG. 18 is a perspective view of a contact tip having certain features and advantages according to one embodiment.

FIG. 19 is a cross-sectional view of the contact tip of FIG. 18, taken along line 19-19 of FIG. 18.

FIG. 20 is a cross-sectional view of an additional embodiment similar to the embodiment of FIGS. 18 and 19, except that two openings are provided to hold a contact element.

FIG. 22 is a perspective view of a portion of the contact tip of FIG. 18.

FIG. 23 is a cross-sectional view of the portion of the contact tip of FIG. 22, taken along line 23-23 of FIG. 22.

FIG. 27 is a cross-sectional view of another embodiment of a contact tip.

FIG. 28 is a schematic view of another embodiment of a contact tip having a plurality of contact elements.

FIG. 29 is a schematic view of one variation of a contact element and a portion of a retention member for the contact tip of FIG. 28.

FIG. 30 is a schematic view of one variation of a contact element and a portion of a retention member for the contact tip of FIG. 28.

FIG. 31 is a schematic view of one variation of a contact element and a portion of a retention member for the contact tip of FIG. 28.

DETAILED DESCRIPTION OF PREFERRED EMBODIMENTS

Figure 1:
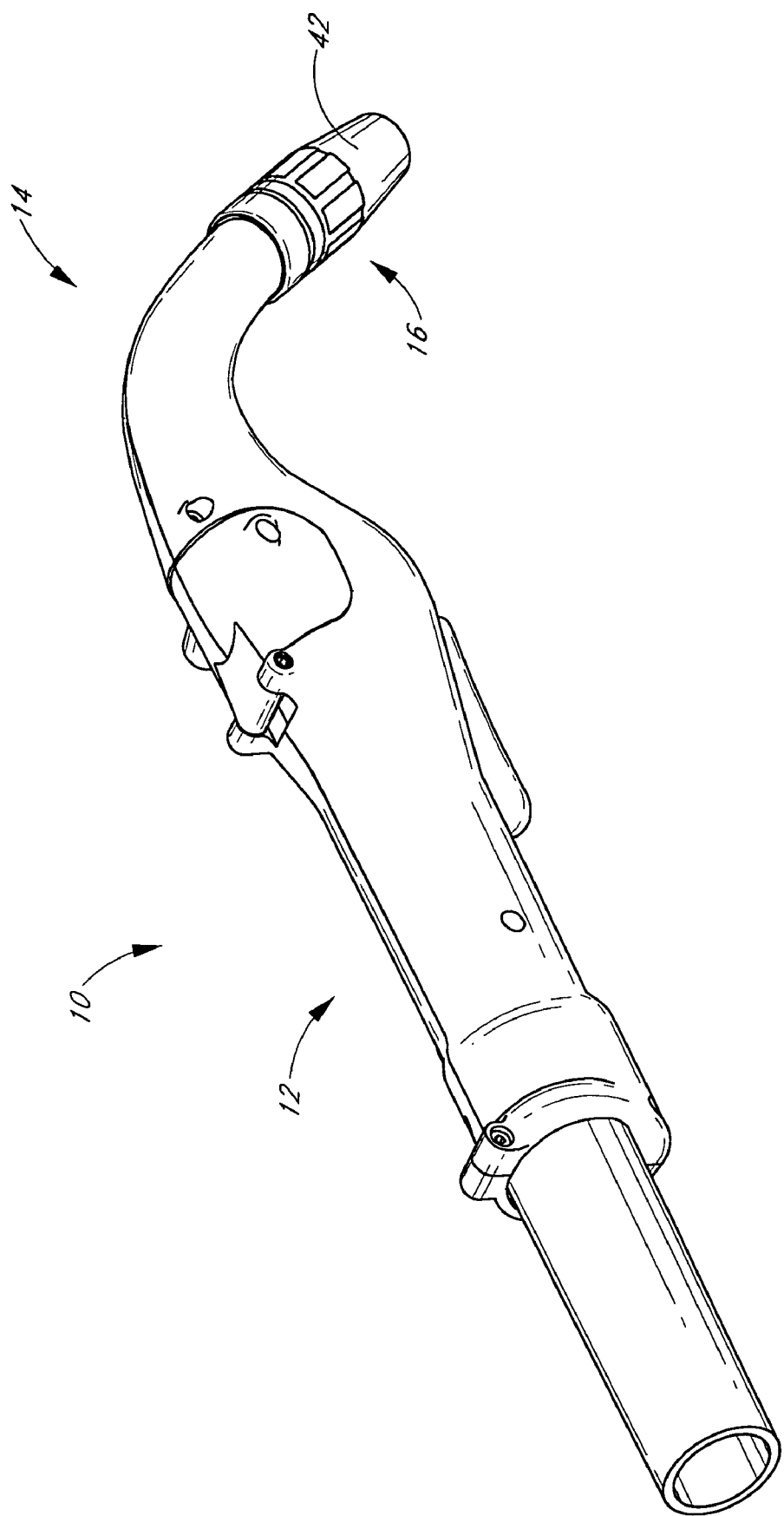
FIG. 1 is a perspective view of a welding gun having certain features and advantages according to one embodiment.

To enhance understanding of one embodiment of a contact tip, contact tips are discussed in connection with illustrative welding guns shown in FIGS. 1-17. However, unless explicitly claimed, the welding gun embodiments are not to be considered part of the claimed invention, and those of skill in the art will appreciate that the contact tip can be used in connection with virtually any type of welding gun. Accordingly, some embodiments of contact tips shown in FIGS. 18-32 will be described first, after which some embodiments of contact tips in combination with welding guns as shown in FIGS. 1-17 will be described.

I. Contact Tips

While embodiments of the invention are described below in connection with particular welding guns, it should be noted that other embodiments of the invention can comprise, or be incorporated or implemented in, a wide variety of welding systems. The particular features and advantages associated with the welding guns described below may or may not be associated with other embodiments. In one embodiment, a welding gun is advantageously provided with a contact tip that increases the amount of contact between the contact tip and the weld wire, to provide a more consistent flow of current to the weld wire, while reducing the likelihood that the weld wire will become lodged in the contact tip causing failure.

With reference to FIGS. 18-24, according to one embodiment, a contact tip 46 comprises an elongate body 200. The elongate body 200 preferably is made of a conductive material, such as copper or other suitable conductive metals. The elongate body 200 preferably has a generally cylindrical shape with a first end 202 and a second end 204. The first end 202 preferably is configured to be coupled to a diffuser, such as, for example, the diffuser described above. In the illustrated embodiment, the first end 202 has a reduced profile and is provided with threads for coupling the contact tip 46 with the threads of the diffuser. In other embodiments, any suitable structure, configuration, or method can be used for coupling the first end 202 of the contact tip 46 with the diffuser. The second end 204 of the elongate body 200 is configured to guide a weld wire 206. In the illustrated embodiment, the second end 204 is slightly tapered.

A first opening 208 extends longitudinally through the elongate body 200 between the first end 202 and the second end 204. The first opening 208 preferably is sized to receive a weld wire 206. As stated above, the contact tip 46 preferably conducts adequate current, to the weld wire 206. In order for current to flow from the contact tip 46 to the weld wire 206, the weld wire 206 should remain in contact with the contact tip 46. However, if the first opening 208 is too large, contact between the weld contact tip 46 and the weld wire 206 is less likely to be continuously maintained. Depending on the size of the weld wire 206 and the size of the first opening 208, the weld wire 206 may repeatedly come in and out of contact with the contact tip 46. When contact with the contact tip 46 is lost, current ceases to flow through the weld wire 206. Even a momentary loss of current through the weld wire 206 is undesirable. However, reducing the size of the first opening 208 to minimize the loss of contact can also provide significant problems, as discussed above. When the hole is too small, the weld wire 206 can become lodged in the contact tip 46. If the weld wire 206 becomes lodged in the contact tip 46 it may fuse with the contact tip 46. Burnback can cause the contact tip 46 to fail if the feeding of weld wire 206 through the contact tip 46 is stopped while an arc is maintained.

Accordingly, in one embodiment, the diameter of the first opening 208 preferably is large enough to minimize the risk that the weld wire 206 will become lodged. Contact between the weld wire 206 and the contact tip 46 can be maintained by a contact element 210 extending into the first opening 208 to press the weld wire 206 against an inside surface of the contact tip 46, as will be described further below. In one embodiment, the diameter 212 of the first opening 208 preferably is between about 0.008 inches and about 0.015 inches greater than the diameter 214 of the weld wire 206 to be used, to allow the weld wire 206 to freely pass through the first opening 208 and avoid becoming lodged in the contact tip. In some embodiments the differences in the diameters 212, 214 can be greater or smaller. The differences in diameters 212, 214 preferably are sufficient that variations in the diameter 214 of the weld wire 206, due to manufacturing tolerances, thermal expansion, or any other reason, generally do not cause the weld wire 206 to become lodged within the contact tip 46. Aluminum wires generally require a larger sized hole than steel wires require.

The elongate body 200 has an outer surface 216 and an inner surface 218. In one embodiment, a groove 220 is defined circumferentially in the outer surface 216 of the elongate body 200. In one embodiment the groove 220 provided is shorter in length than the groove associated with the stainless steel clip. Using a relatively shorter groove makes the contact tip less costly to manufacture and results in a contact tip that is generally stronger. In the illustrated embodiment, the groove 220 is positioned closer to the first end 202 of the elongate body 200. By locating the groove closer to the first end 202 of the elongate body 200, the groove 220 and retention member 228 are positioned further from the heat generated by the welding arc. In other embodiments, the location and configuration of the groove 220 can vary. In some embodiments, the groove 220 can be positioned on the back half of the elongate body 200. In some embodiments, the groove 220 can be positioned on the third of the elongate body 200. In some embodiments, the groove 220 can be positioned on the back quarter of the exposed portion of the elongate body 200. In still other embodiments the groove 220 can be omitted.

In one embodiment, a generally circular slot 222 is located at least partially within the groove 220 and extends further into a side portion 224 of the elongate body 200. A second opening 226 is located at least partially within the generally circular slot 222 and extends radially through the elongate body 200 between the outer surface 216 and the inner surface 218. The generally circular slot 222 is configured to support a generally spherical contact element 210. The second opening 226 is configured to allow the generally spherical contact element 210 to extend at least partially into the first opening 208 of the elongate body 200. In other embodiments the slot 222 can have different shapes. The slot 222 preferably supports a contact element 210 that extends at least partially into the first opening 208. In some embodiments, the slot 222 preferably supports contact elements that are rotatable within the slot 222.

FIG. 20 illustrates another embodiment of a contact tip similar to the contact tip shown in FIGS. 18-19, except as described below. A plurality of generally radial slots 322*a,b* are desirably located at least partially within the groove 320 and each extends into a side portion of the elongate body 300. The slots 322*a,b* form second and third openings 326*a,b* in the elongate body 300. The slots 322*a,b* can extend radially through the elongate body 300 between the outer surface 316 and the inner surface 318. The generally circular slots 322*a,b* are each configured to support a generally spherical contact element 310 in the illustrated embodiment. The openings 326*a,b* are configured to allow the generally spherical contact element 310 to extend at least partially into the first opening 308 of the elongate body 300. In use, one contact element, e.g., the generally spherical contact element 310, preferably is placed within one of the plurality of slots 322*a,b* and/or openings 326*a,b*. As the contact tip is used over time, the contact tip and/or the contact element 310 may become warm. It can be advantageous to remove a worn contact element 310 and place a new contact element in another of the plurality of slots 322*a,b* and/or openings 326*a,b*. In some embodiments, the plurality of slots 322*a,b* and/or openings 326*a,b* can be spaced at any suitable location on the elongate body 300. For example, slots 322*a,b* and/or openings 326*a,b* can be spaced from each other longitudinally rather than, or as well as, radially.

With reference again to the embodiments of FIGS. 18-24, in the illustrated embodiment, the groove 220 is configured to support a retention member, e.g., flexible member 228, extending circumferentially about the elongate body 200 and the generally spherical contact element 210. The groove 220 preferably is deep enough to retain the flexible member 228 in a desired location along the elongate body 200.

In one embodiment the contact tip 46 comprises a generally spherical contact element 210 configured to be coupled with the elongate body 200. The generally spherical contact element 210 preferably is configured to be supported in the generally circular slot 222. The generally spherical contact element 210 preferably can extend at least partially through the second opening 226 into the first opening 208 when positioned within the slot 222. In some embodiments, the generally spherical contact element 210 preferably extends into the first opening 208 between about 0.015 inches and about 0.020 inches. The generally spherical contact element 210 preferably is configured to contact the weld wire 206 as it passes through the contact tip 46 to hold the weld wire 206 against the inner surface 218 of the contact tip 46 to maintain a generally continuous flow of current through the weld wire 206.

The generally spherical contact element 210 can be a ball. The ball preferably contacts the weld wire 206 at a single point. The generally spherical contact element 210 preferably is made of a durable material. In other embodiments, the contact element 210 can have other suitable shapes. In some embodiments, the generally spherical contact element 210 can be made of steel or ceramic. A ceramic contact element 210 can be advantageous in some embodiments because current flowing through the contact tip 46 will not be conducted through the ceramic material. In some embodiments, it is advantageous to provide a contact element that will not provide the electrical current to the weld wire. Preferably the contact element will minimize arcing or current flow between the contact element and the weld wire in some embodiments.

The contact tip 46 comprises a retention member, e.g., flexible member 228, configured to be coupled with the elongate body 200 and the generally spherical contact element 210. The flexible member 228 preferably is capable of extending circumferentially about the elongate body 200 and the generally spherical contact element 210. The flexible member 228 preferably is configured to be supported within the groove 220.

However, there are several disadvantages of using a tubular stainless steel split clip to hold the clamping ball. The clip may require machining and may be relatively expensive to manufacture. Additionally, the size and shape of the clip can make the contact tip more difficult to machine, which can increase production costs. Additionally, the clip typically is sized to function only with contact tips of a particular size. The clip, having a continuous metal surface, can become hot during operation of the welding gun and may be subject to thermal stresses during expansion and contraction. The fit between the contact tip and clip during use can be affected by their different thermal expansion properties. Variations in the clip can make it difficult to control the amount of force that the clip will place on the clamping ball and weld wire. In some cases, the clip can shift and exert a force on the clamping ball that is not directed at a right angle relative to the surface of the weld wire. Additionally, in some cases the clip can be difficult to assemble with the contact tip.

Figure 32:
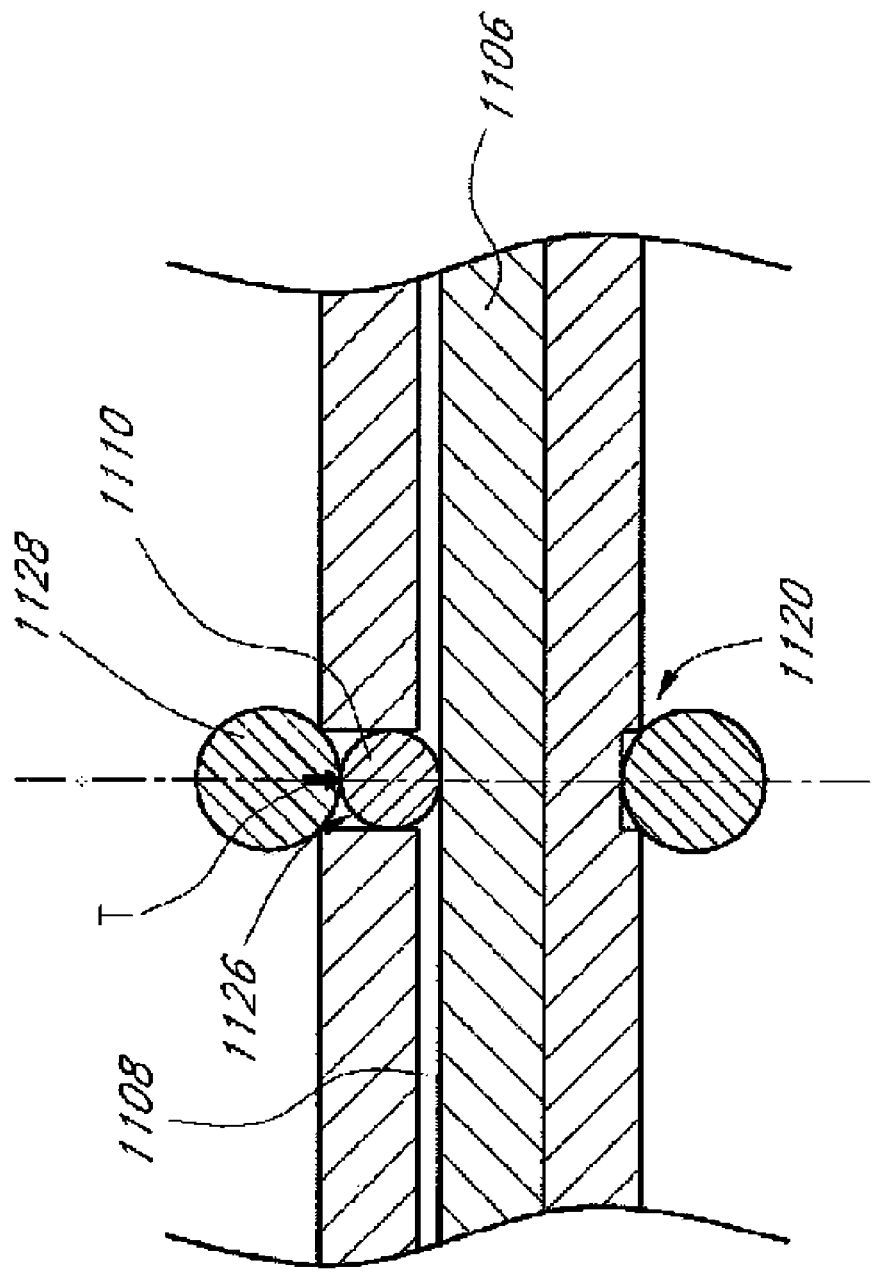
FIG. 32 is a cross-sectional view of another embodiment of a contact tip with a self-centering retention member configuration.

In some embodiments, the flexible member 228 can be an O-ring. In some embodiments, the O-ring can comprise rubber, plastic, Silicon, Vicon, Neoprene, and/or another suitable material. The O-ring preferably comprises an elastic material. The O-ring can have an annular and/or toroidal shape. The O-ring can have a generally circular cross-sectional shape. The O-ring can have a generally flat cross-sectional shape. An O-ring is advantageous in that it is inexpensive, resilient, easy to manufacture and install, capable of use with different sized contact tips, and is commonly manufactured to sufficient tolerances for this application. The flexible member 228 preferably is made of a durable material. It has been discovered that O-rings generally tolerate the high-heat welding environment unexpectedly well. The flexible member 228 preferably extends around the elongate body 200 of the contact tip 46 and holds the generally spherical contact element 210 within the generally circular slot 222. It has been discovered that O-rings generally provide a constant and consistent force to the contact element without placing excessive pressure on the weld wire. The O-ring can be self-centering within the groove to provide a consistent force directed transverse to and, preferably, at a right angle relative to the surface of the weld wire (FIG. 32). Excessive pressure, or pressure directed along other angles, typically interferes with feeding the wire and/or results in deformation, shavings, chips, or damage to the welding wire or tip.

The flexible member 228 preferably holds the generally spherical contact element 210 against the weld wire 206 as it passes through the welding gun. The flexible member 228 can allow the generally spherical contact element 210 to move radially in response to changes in the diameter of the weld wire 206. For example, if the weld wire 206 expands, the generally spherical contact element 210 can be displaced against the flexible member 228. If the weld wire 206 contracts, the flexible member 228 places pressure on the generally spherical contact element 210 to maintain the contact between the generally spherical contact element 210 and the weld wire 206. The contact with the generally spherical contact element 210 forces the weld wire 206 to be in contact with the inside surface of the contact tip 46 to generally maintain the flow of current through the weld wire 206.

According to one embodiment, the welding gun has a contact tip 46 that can accurately guide a weld wire 206 to the point of contact with the workpiece. Additionally, the contact tip 46 can generally maintain improved contact with the weld wire 206 to conduct adequate current to the weld wire 206. Additionally, proper spacing between the inner surface 218 of the contact tip 46 and the weld wire 206 can be maintained, thus minimizing the risk of burnback. The risk that the weld wire 206 will become lodged in the contact tip 46 is minimized while sufficient contact and current flow between the contact tip 46 and the weld wire 206 is maintained.

As stated above, removing a worn contact tip from the gas diffuser can be time consuming and potentially dangerous. Embodiments that maintain sufficient current flow reduce the risk of burnback and are expected to have generally longer service lives without significantly increasing production costs. Consequently, they are likely to be replaced less often, thereby reducing the overall costs and risks associated with retooling.

Figure 25:
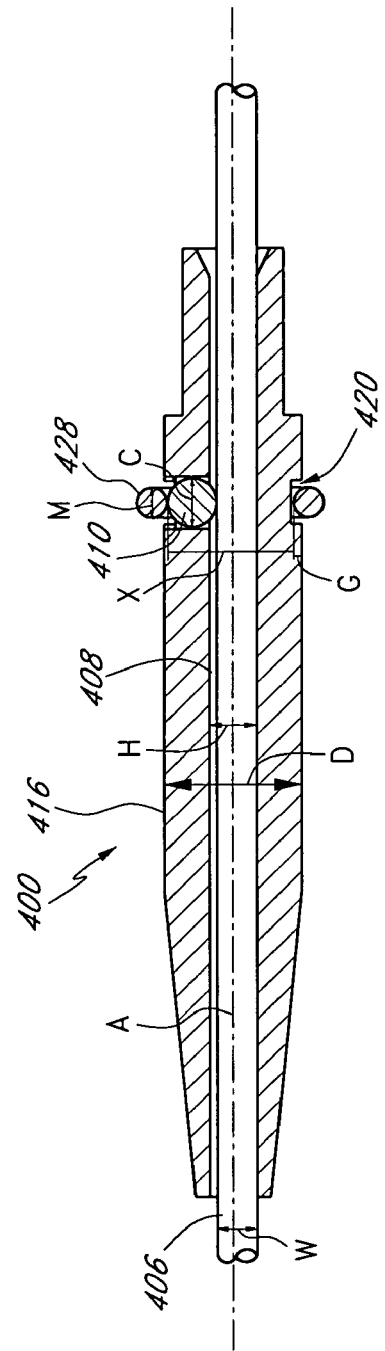
FIG. 25 is a cross-sectional view of another embodiment of a contact tip and weld wire.

FIGS. 25-32 show additional embodiments, which are similar to the embodiments described previously, except as noted below. With reference to FIG. 25, in one embodiment the diameter D of the contact tip 400 can be about 0.250 inches. The diameter H of the first opening 408 in the illustrated embodiment preferably is about 0.060 inches and the diameter W of the weld wire 406 that can be used with the illustrated embodiment preferably is about 0.045 inches. In some embodiments, the diameter H of the first opening 408 preferably is about 0.015 inches larger than the diameter W of the weld wire 406. The diameter C of the contact element 410, e.g., ball, can be about 0.093 inches. The cross-sectional diameter M of the retention member 428, e.g., an O-ring or spring member, can be between about 0.070 inches in some preferred embodiments. The contact element 410 in the illustrated embodiment preferably extends into the first opening 408 about 0.020 inches. The depth G of the groove 420 for holding the retention member 428 in place preferably is configured such that when the retention member 428 is placed over the groove 420 and extends over the contact element 410, the retention member 428 exerts a force on the contact element 410. The depth of the groove 420 in the illustrated embodiment preferably is about 0.025 to about 0.035 inches.

In some embodiments, one suitable groove depth G can be calculated as described below, $$G = D/2 - (\frac{1}{6}H + C)$$

where G is the groove depth, D is the diameter of the contact tip, H is the diameter of the first opening, and C is the diameter or length of the contact element. From a longitudinal center axis A of the contact tip 400 to the outer surface 416 of the contact tip 400 is one half the diameter D of the contact tip 400. In one embodiment, the contact element 410 preferably extends into the first opening 408 about ⅓ of the diameter H of the first opening 408. Accordingly, the distance from the longitudinal center axis A to the contact element 410 is one half the diameter H of the first opening 408, less ⅓ of the diameter H of the first opening 408, or one sixth the diameter H of the first opening 408. Accordingly, an outer surface of the contact element 410 will be positioned away from the longitudinal center axis A a distance equal to one sixth the diameter H of the first opening 408 plus the diameter C or length of the contact element 410. To select a possible groove depth G for the retention member 428, this distance is subtracted from one half the diameter D of the contact tip 400. For example, in one embodiment described above, one half the diameter of the contact tip (0.125 inches), less one sixth of the diameter of the first opening (0.010 inches), and less the diameter of the contact element (0.093 inches), is 0.022 inches. The groove depth G preferably can vary from the calculated value by plus or minus about 0.005 inches. Accordingly, in one example above, the groove depth G is selected to be 0.025 inches. In one embodiment, the groove depth G for contact tips preferably is between about 0.020 and about 0.030 inches. In some embodiments, contact tips having different diameters or lengths can be used so that the groove depth G can be between about 0.020 inches and 0.030 inches. In another embodiment, the groove depth G for contact tips preferably is between about 0.010 and about 0.040 inches.

A retention member 428 preferably is selected to sit within the groove 420 and hold the contact element 410 within the contact tip 400. In some embodiments, the size of a suitable retention member 428 can be calculated as described below, $$X = (\tfrac{2}{3})(D - 2G)$$

where X is the unstretched inner diameter of the O-ring, D is the diameter of the contact tip, and G is groove depth. The retention member 428 preferably is selected so that when stretched or expanded by about 50% the retention member inner diameter X is large enough to retain the contact element 410 and set within the groove 420. As described above, the groove diameter, e.g., the cross-sectional distance from the groove 420 (opposite the contact element 410) to the opposite edge of the contact element 410, can be about 0.200 inches. In one embodiment, an O-ring can be used for the retention member 428. A #7 O-ring has an inner diameter X of about 0.145 inches unstretched, with an inner diameter X of about 0.217 when stretched about 50%. The selected O-ring preferably has an unstretched inner diameter less than the groove diameter, and a 50% stretched inner diameter greater than the groove diameter.

Figure 26:
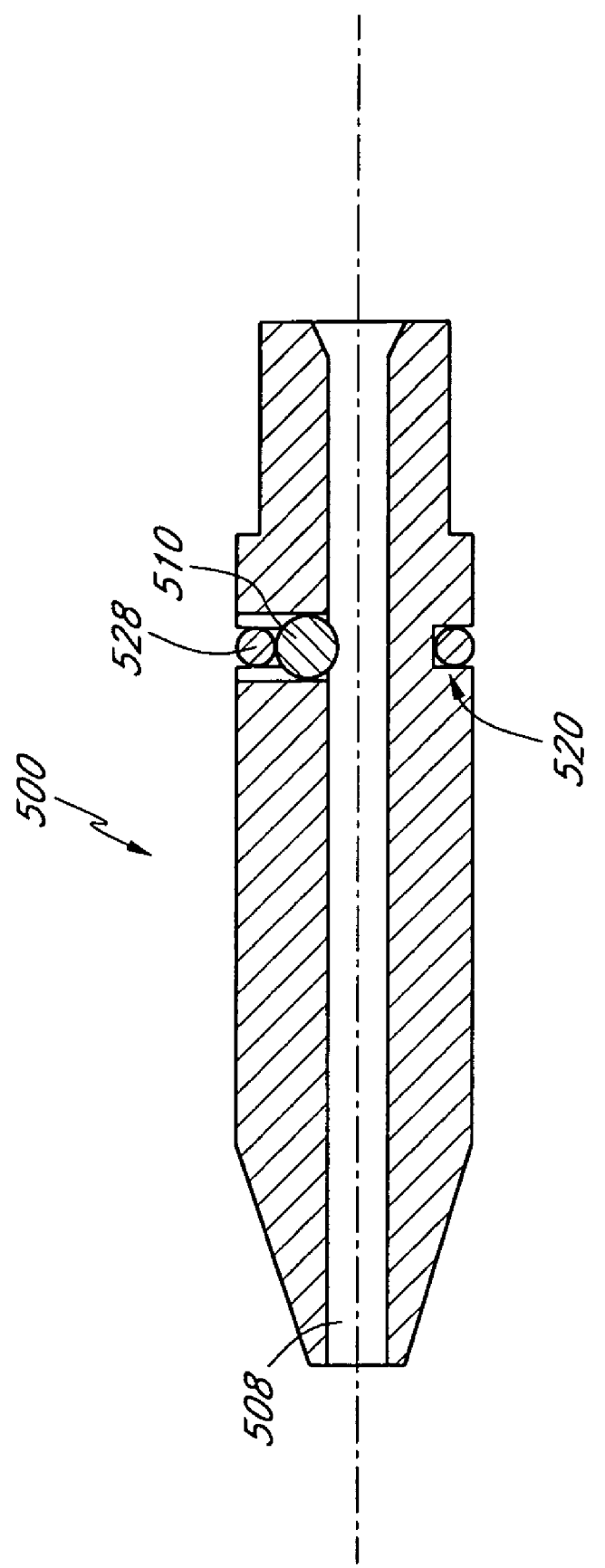
FIG. 26 is a cross-sectional view of another embodiment of a contact tip.

With reference to FIG. 26, in another embodiment, the diameter of a contact tip 500 can be about 0.250 inches. The diameter of the first opening 508 in the illustrated embodiment preferably is about 0.044 inches and the diameter of the weld wire that can be used with the illustrated embodiment preferably is about 0.035 inches (not shown). The diameter of the contact element 510, e.g., ball, can be about 0.093 inches. The cross-sectional diameter of the retention member 528, e.g., an O-ring or spring member, can be between about 0.031 inches and about 0.070 inches in some preferred embodiments. The contact element 510 in the illustrated embodiment preferably extends into the first opening 508 about 0.015 inches. The depth of the groove 520 for holding the retention member 528 in place preferably is configured such that when the retention member 528 is placed over the groove 520 and extends over the contact element 510, the retention member 528 exerts a force on the contact element 510. The depth of the groove 520 in the illustrated embodiment preferably is about 0.035 inches. In some embodiments, the retention member 528, when stretched and positioned on the contact tip 500, preferably rests within the slot 520 such that the outer diameter of the retention member 528, is about equal to or less than the outer diameter of the contact tip 500.

With reference to FIG. 27, in another embodiment, the diameter of a contact tip 600 can be about 0.375 inches. The diameter of the first opening 608 in the illustrated embodiment preferably is about 0.060 inches and the diameter of the a weld wire that can be used with the illustrated embodiment preferably is about 0.045 inches (not shown). A contact element 610, such as a ball, can have a diameter of about 0.125 inches. A retention member 628 is provided. The contact element 610 preferably extends into the first opening 608 a distance between about 0.015 inches and about 0.020 inches. The depth of the groove 620, in the illustrated embodiment, preferably is less than or equal to about 0.062 inches. The total thickness of contact tip 600 at the groove location, in the illustrated embodiment, preferably is greater than or equal to about 0.250 inches. In some embodiments, minimizing the depth of the groove 620 provides increased strength and durability to the contact tip 600. In alternative embodiments, a plurality of smaller balls, or a hardened rod with rounded ends, or with one rounded end and one flat end, can be used, as explained below with reference to FIGS. 28-31.

With reference to FIG. 28, in one embodiment the diameter of the contact tip 700 can be about 0.375 inches. The diameter of the first opening 708 in the illustrated embodiment preferably is about 0.044 inches and the diameter of the weld wire that can be used with the illustrated embodiment preferably is about 0.035 inches (not shown). As shown in FIG. 28, the contact element 710 can comprise a plurality of balls. In the illustrated embodiment, two balls each have a diameter of about 0.0935 inches.

Alternative embodiments, can have contact elements having other shapes, e.g., such as those shown in FIGS. 29-31. In some embodiments, contact elements can include rods 810, 910, 1010 with curved or flat ends. Contact elements can have different shapes based on the size and configuration of the contact tip. It may be advantageous to provide a contact element with an oblong shape, for example, to reduce, limit or minimize the depth of the groove, as described above. It is advantageous to hold the retention member in place while maintaining the integrity and strength of the contact tip. Accordingly, in some cases it is advantageous to minimize the depth of the spring groove. Contact elements can be formed of a durable material, such as hardened steel shafts and other suitable metals or ceramic materials. Some advantages can be achieved through the use of suitable durable materials to form a contact element.

As shown in FIG. 28, the contact element 710 in the illustrated embodiment preferably extends into the first opening 708 about 0.015 inches. The depth of the groove can be reduced, and in some cases the groove can be eliminated entirely, as shown in the illustrated embodiment. The tension on the weld wire can be controlled by the depth of the groove, or the size and diameter of the retention member 728. The contact element 710 can be configured so that a small groove can hold the retention member 728 in position. In some embodiments the retention member 728 can be a flexible member, such as an O-ring made of silicon. In the illustrated embodiment a plurality of O-rings, e.g., two, are placed over the contact tip 700. In other embodiments, one or more spring wires can be used as retention members 828, 928. The spring members 828, 928 can have a generally circular cross-sectional configuration, as shown in FIGS. 29-30. The spring members 828, 928 can be formed as one or more wires. In some cases two wires can be used. Where one wire is used, in some embodiments it can be advantageous to overlap the wire on itself. A flexible member 1028 can have a generally flat cross-sectional configuration, as shown in FIG. 31. The flexible member 1028 can be formed as a band. In one embodiment, the flexible member 1028 can comprise a generally flat O-ring formed of silicon or another suitable material.

As shown in FIG. 32, the contact element 1110 in the illustrated embodiment preferably extends into the first opening 1108. The groove 1120 preferably cooperates with the retention member 1128 such that the retention member 1128 is self-centering within the groove 1120. The tension on the weld wire 1106 can be controlled by the depth of the groove 1120, or the size and diameter of the retention member 1128. In some embodiments the retention member 1128 can be a flexible member, such as an O-ring. In the illustrated embodiment, the O-ring contacts side portions of the groove 1120 such that the O-ring is centered within the groove 1120 above the second opening 1126. Centering the O-ring provides that a force T generated by the stretched O-ring acts transverse to and, preferably, at a right angle relative to the surface of the weld wire 1106. The perpendicular force T of the O-ring is a constant and consistent force applied to the contact element 1110 to avoid providing pressure directed along other angles, which can interfere with feeding the wire and/or result in deformation, shavings, chips, or damage to the welding wire or tip. For example, one disadvantage of using a tubular stainless steel split clip to hold the clamping ball is that in some cases the clip can shift and exert a force on the clamping ball that is not directed at a right angle relative to the surface of the weld wire.

II. Welding Guns

Figure 2:
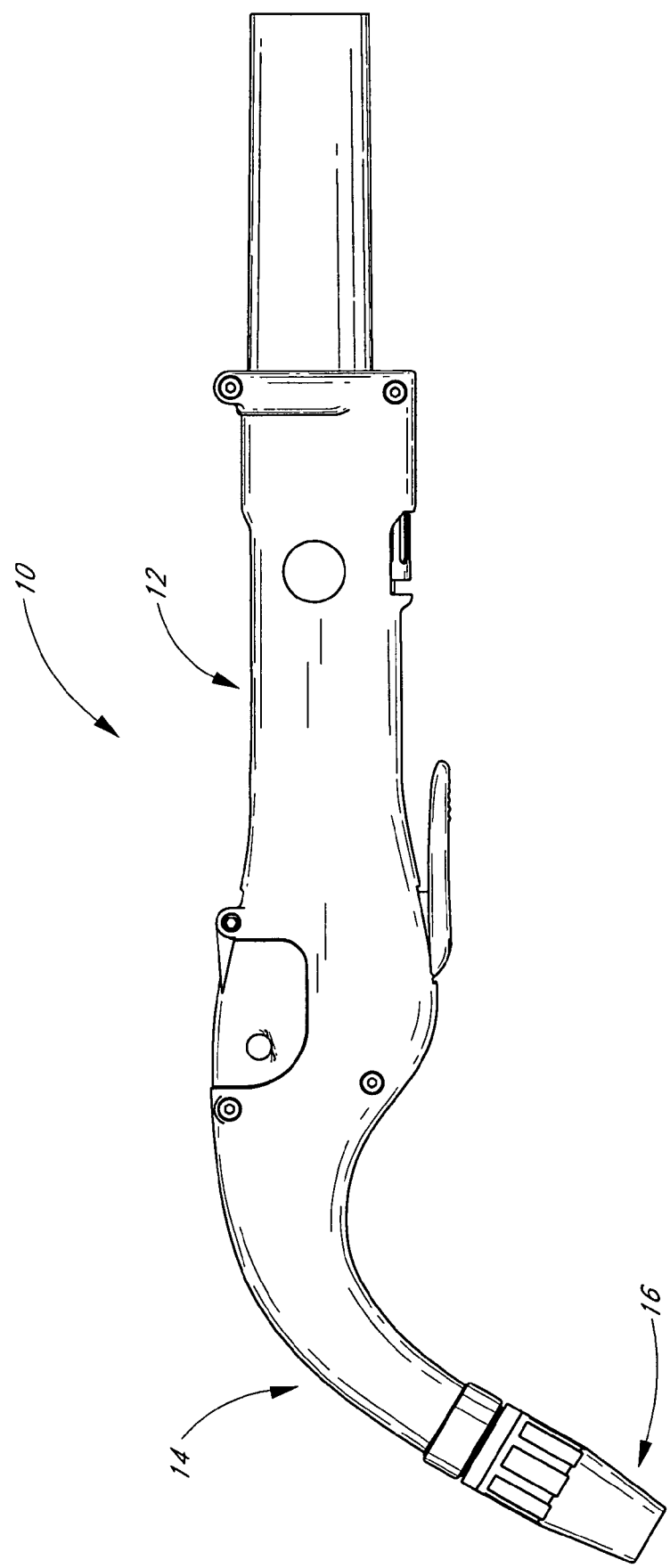
FIG. 2 is a side elevational view of the welding gun of FIG. 1.

FIGS. 1 and 2 are a perspective and a side view of a welding gun 10 having certain features and advantages according to one embodiment of the invention. In the illustrated embodiment, the gun 10 includes a handle 12, a torch barrel section 14 and a welding tip assembly 16. The welding tip assembly 16 preferably comprises a contact tip 46 (see FIGS. 4, 11-16), in accordance with one embodiment of the invention, as will be described in more detail below.

Figure 3:
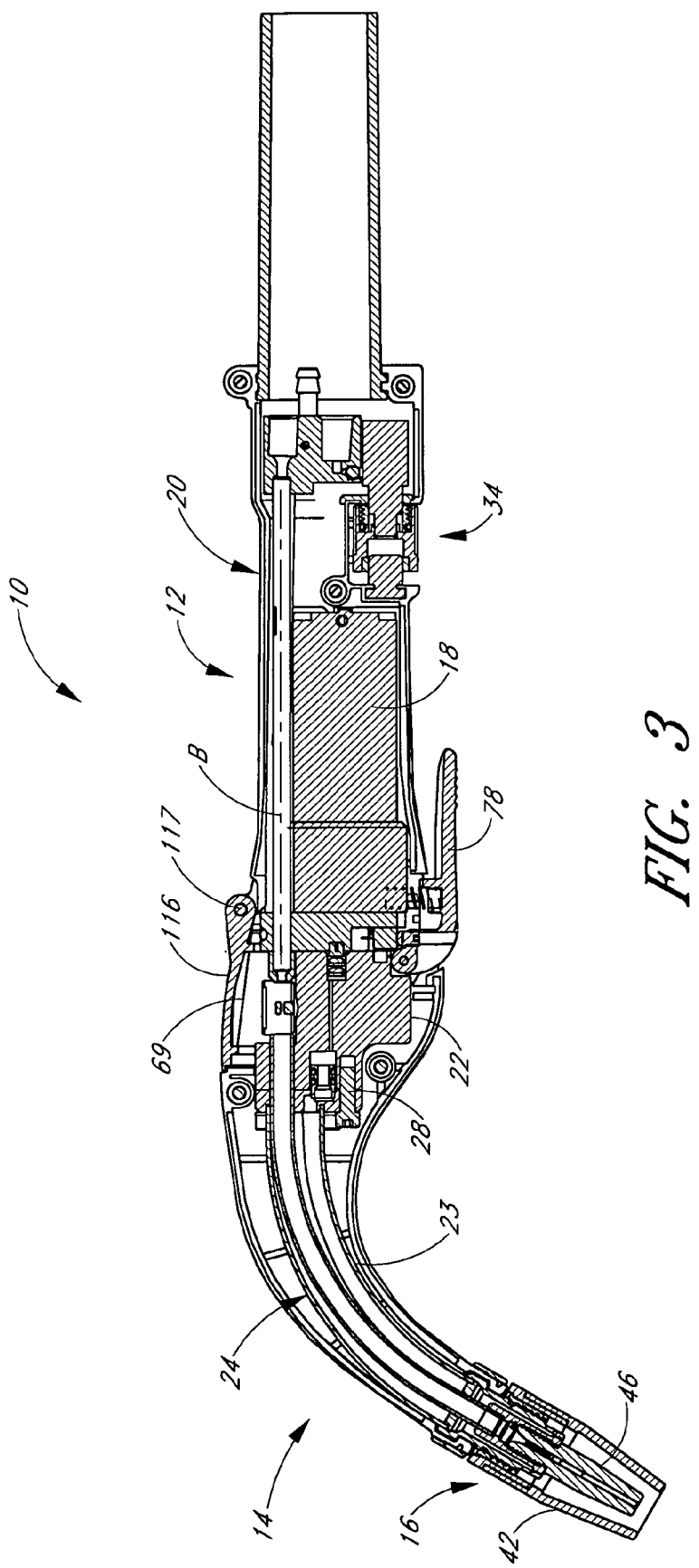
FIG. 3 is a cross-sectional view of the welding gun of FIG. 1

FIG. 3 is a cross-sectional view of the gun 10 and illustrates a motor 18, which is positioned inside the handle 12 generally along the longitudinal axis of the gun 10. The illustrated gun 10, therefore, is an "in-line" welding gun. However, in other embodiments, other types of welding guns can be used. The handle 12 and band section 14 are covered by a substantially rigid, two-piece molded plastic casing 20a, 20b, which is best seen in FIG. 4 and will be described in more detail below.

Figure 4:
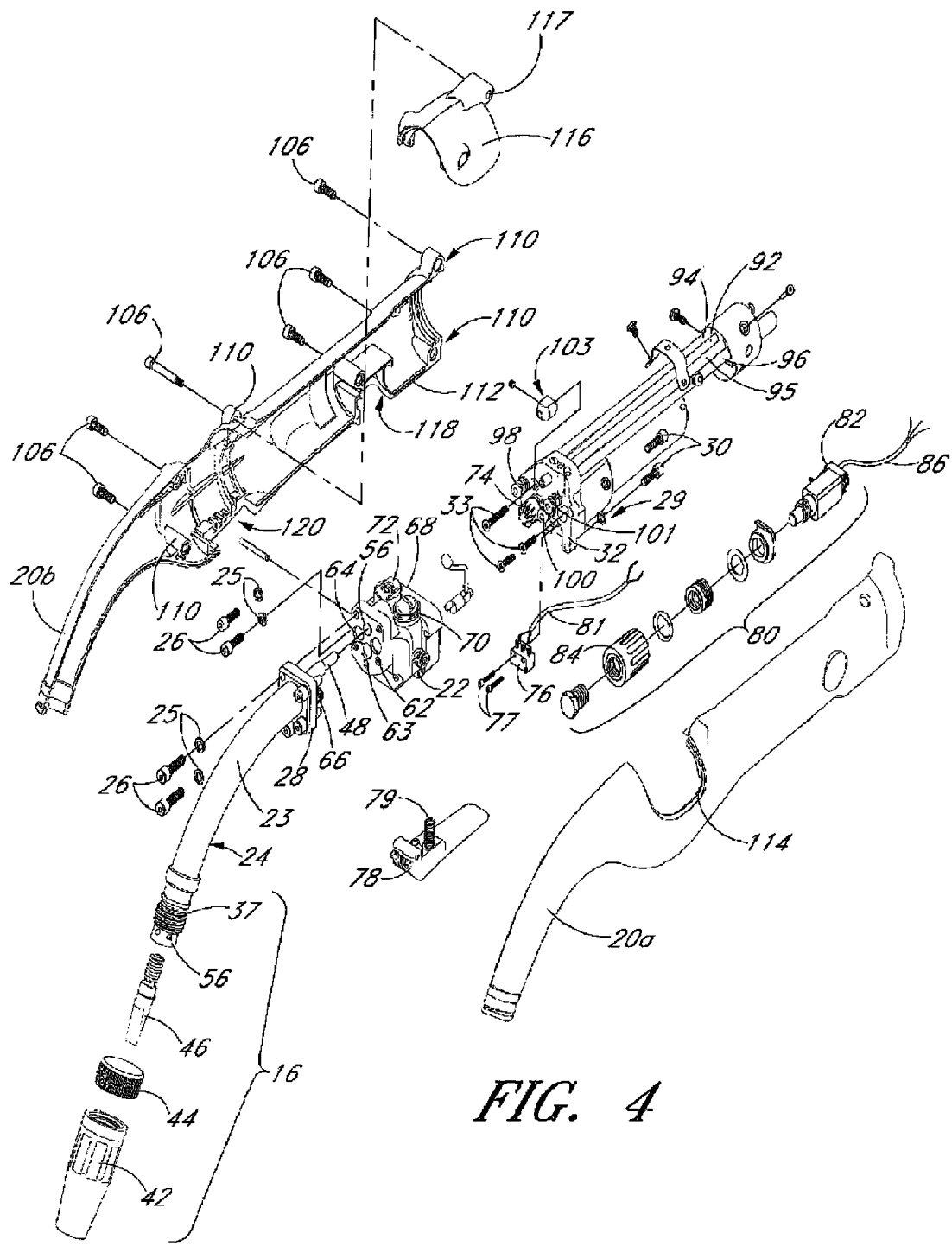
FIG. 4 is an exploded perspective view of the welding gun of FIG. 1.

With particular reference to FIGS. 3 and 4, the gun 10 includes a block 22, which is preferably made of aluminum. A torch barrel assembly 24 (see also FIG. 5) is removably attached to a distal end of the block 22 by washers 25 and bolts 26, which extend through a barrel mount 28 and into the block 22. In a similar manner, the motor 18 is removably attached to a proximal end of the block 22 by washers 29 and bolts 30, which extend through a motor mount 32 tat is also attached to the motor 18 by bolts 33. A speed control mechanism 80, for controlling the speed of the motor, is attached to the proximal end of the motor 18. The plastic casing 20a, 20b, encloses the block 22, the barrel 24 and the motor 18 when these components are assembled together.

The barrel assembly 24 will now be described in more detail with reference to FIGS. 5-8. As best seen in FIGS. 3 and 7, the barrel assembly 24 extends along a line A that curves away from the longitudinal axis B of the welding gun 10. As illustrated in FIG. 7, the barrel assembly 24 includes an outer sheath 23, which defines a barrel cavity 34. The barrel cavity 34 is closed at the proximal end 27 by the barrel mount 28 and at the distal end 35 by a cap 36. A gas nozzle 37 is fitted over the cap 36 and the distal end 35 of the barrel 24. The gas nozzle 37 includes outer threads 40, for attaching a gas assembly cup 42 and nut 44, which are illustrated in FIG. 4.

Figure 7:
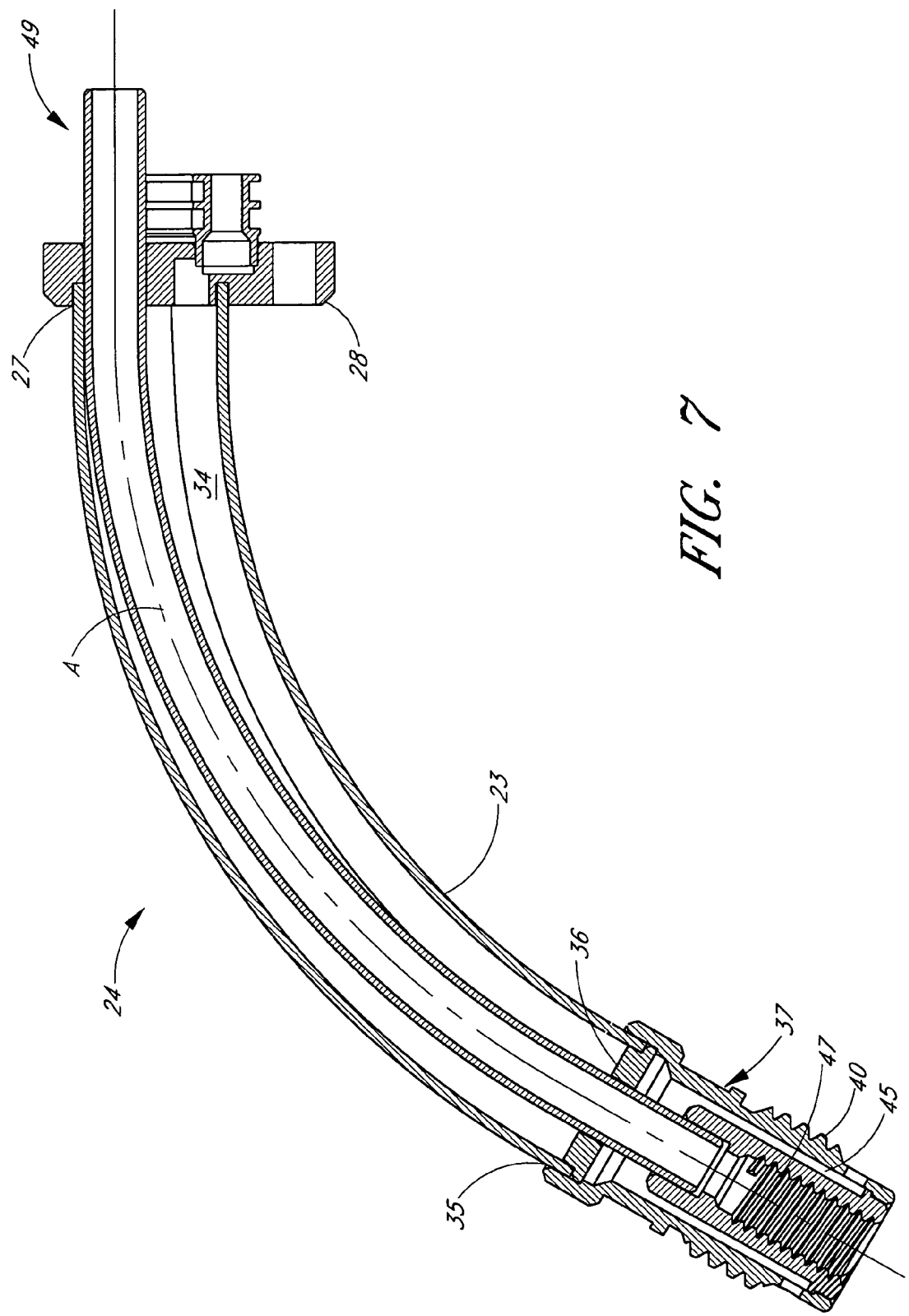
FIG. 7 is a cross-sectional view taken along line 7-7 of FIG. 6.
Figure 8:
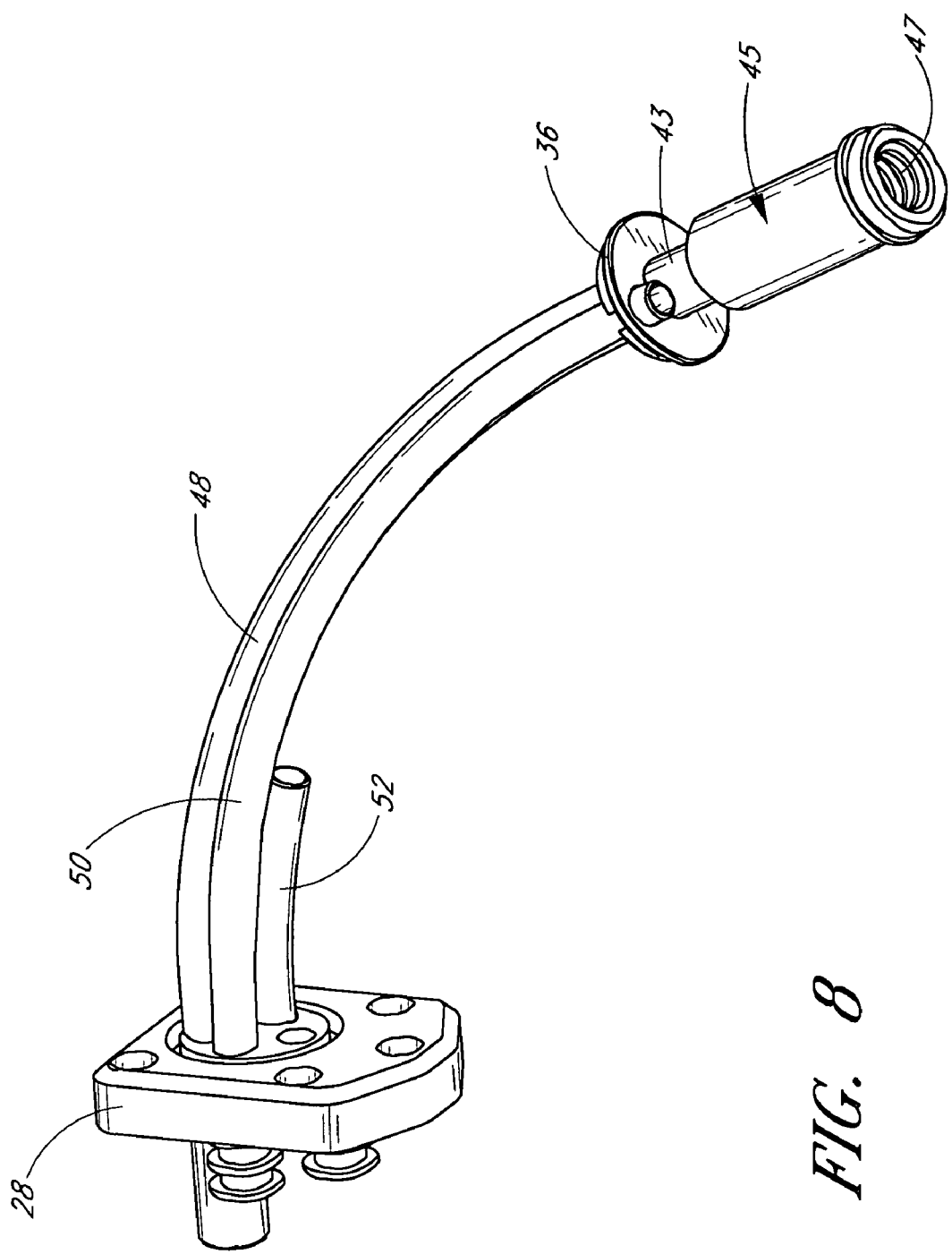
FIG. 8 is a side perspective view of the barrel section with the barrel removed.
Figure 10:
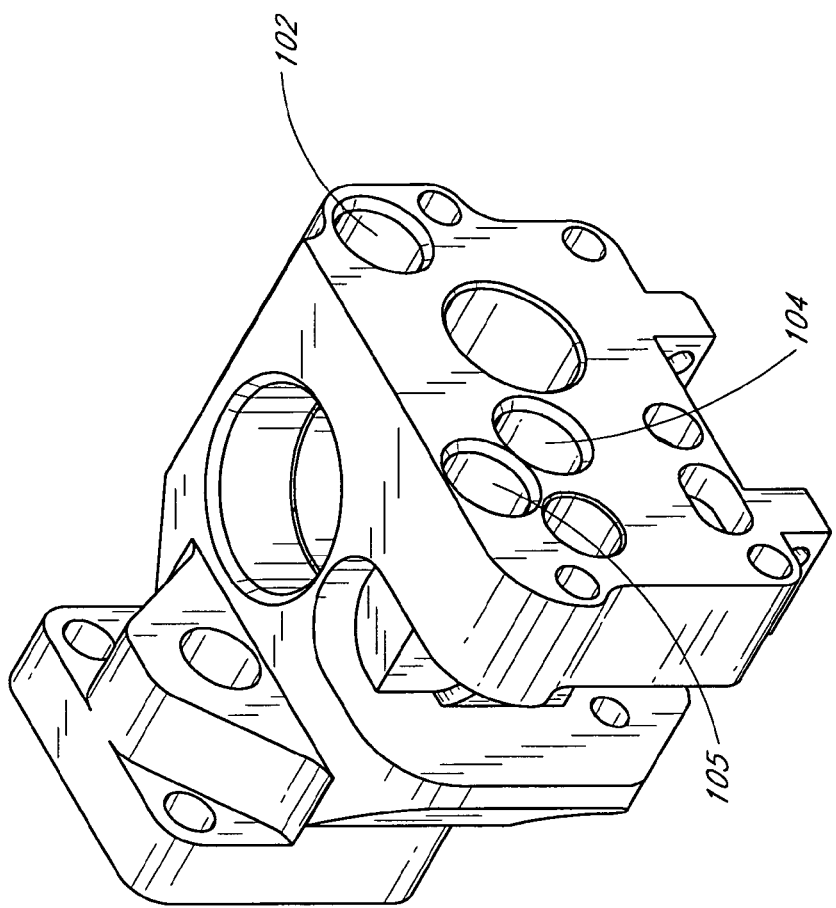
FIG. 10 is a rear perspective view of a block of the welding gun of FIG. 1.

With particular reference to FIGS. 7 and 8, the band assembly 24 preferably includes a wire tube 48, a gas tube 50 and a coolant tube 52 that extend from the barrel mount 32 within the outer sheath 23, which is not illustrated in FIG. 8. In the illustrated embodiment, a tip attachment 45 is secured to the distal end 43 of the wire tube 48 and is positioned in the gas nozzle 37. The tip attachment 45 includes internal threads 47 such that a contact tip 46 (see FIG. 4) can be attached to the tip attachment 45. The contact tip 46 will be described in more detail below in connection with FIGS. 18-24. An inlet 49 of the wire tube 48 extends through the barrel mount 28.

Figure 6:
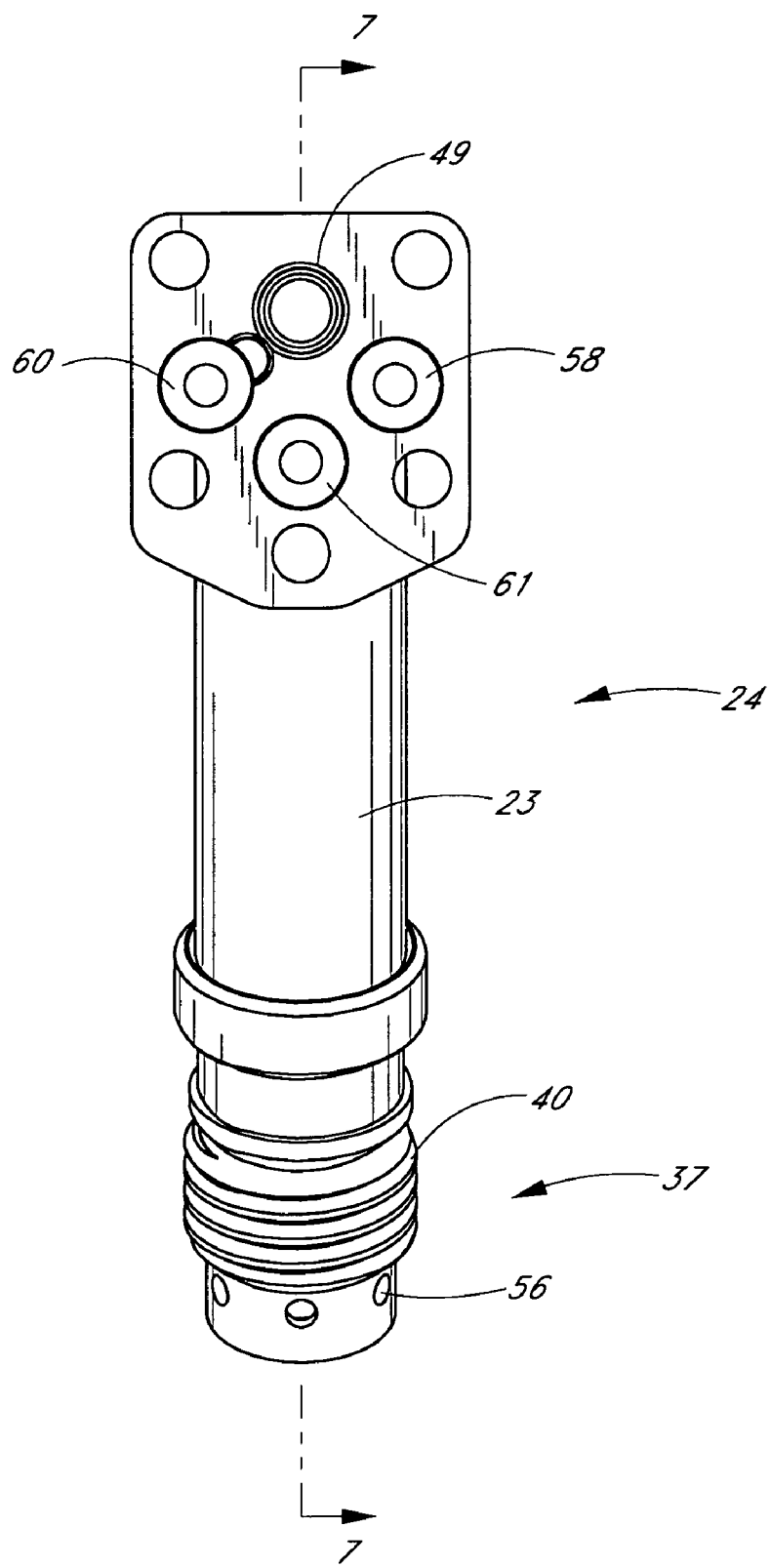
FIG. 6 is a front elevational view of the barrel section of FIG. 1.

As best seen in FIGS. 4 and 6, the gas tube 50 extends through the cap to deliver gas to the gas nozzle 37. The gas nozzle 37 includes a set of openings 56 through which gas can be discharged to shield the tip of the wire (not shown) when the work piece is being welded. With particular reference to FIG. 8, in the illustrated embodiment, the water tube 52 extends in the outer sheath 23 half way to the cap 36 to provide cooling fluid to the torch barrel assembly 24. The gas nozzle 37 tip attachment 45, contact tip 46 and cup 42 (see FIG. 4) together define the welding tip assembly 16 in the illustrated arrangement.

Figure 5:
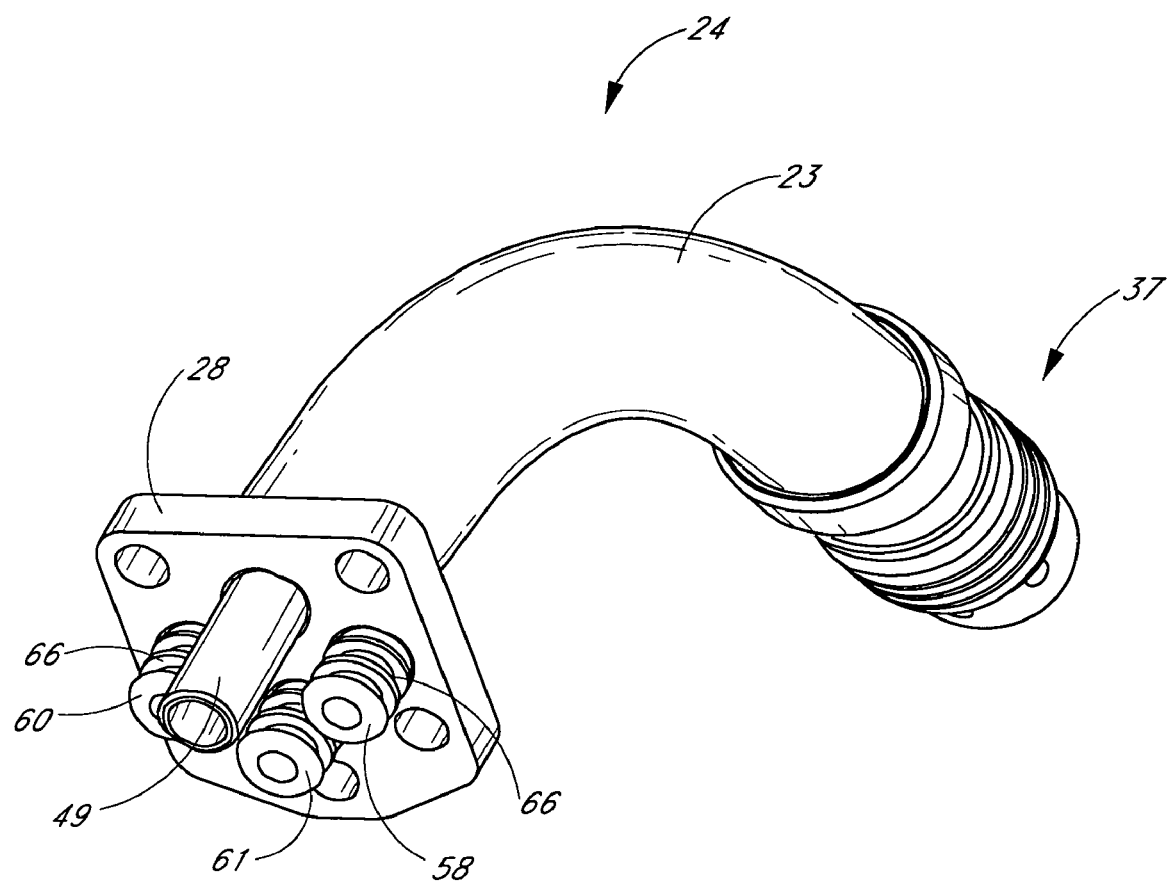
FIG. 5 is a side perspective view of a barrel section of the welding gun of FIG. 1.

With reference to FIGS. 5 and 6, the gas and coolant tubes 50, 52 are connected to connectors 58, 60, which are configured to fit within the gas and coolant openings 62, 64 provided in the block 22 (see FIG. 4). The connectors 58, 60, 61 preferably include O-rings 66 to prevent leaks. As best seen in FIG. 5, in the illustrated embodiment, the connectors 58, 60 are preferably located below the inlet of the wire tube 49. In addition, the connectors 58, 60 are preferably located on opposite sides of the inlet to the wire tube 49. This arrangement is preferred because it allows the wire, gas and water tubes 48, 50, 52 to be centered within the outer sheath 23. Such an arrangement provides for an efficient use of space within the outer sheath 23, which permits a larger diameter of the tubular member 49. As will be explained in more detail below, in some arrangements, the larger diameter of the outer sheath 23 allows for more effective cooling of the torch barrel assembly 24.

The illustrated arrangement also includes a coolant return connector 61 (see FIGS. 5 and 6). The coolant return connector 61 is configured to fit within a coolant return opening 63 provided in the block 22 (see FIG. 4). The illustrated coolant return connector 61 is in direct communication with the barrel cavity 34. As such, in the illustrated arrangement, cooling fluid can flow through the coolant tube 52 to the cap 36 so as to fill the barrel cavity 34 with cooling fluid. The coolant is then discharged through the coolant return connector 61. In modified arrangements, the position and arrangement of the coolant tube 52 and coolant return connector 61 can be reversed or modified. The illustrated arrangement advantageously cools the entire length of the torch barrel assembly 24. In addition, because of the efficient use of space which permits a larger diameter for the outer sheath 23, more cooling fluid can be circulated through the torch barrel cavity 34. This permits the use of a larger welding tip assembly 16 that can utilize more amps.

With reference now to FIGS. 3 and 4, the block 22 includes a cut away section 68 to provide a recess in which is seated a wire feed mechanism 69, which in the illustrated embodiment comprises an idler roller 70, a drive roller 72 and a wire path therebetween. The motor 18 includes a drive shaft 74, which extends into the block 22. The drive roller 72 is coupled to a shaft (not shown), which extends into the block 22 and is driven by the drive shaft 74. The idler roller 70 is mounted on a hinge like member 74 that pivots so that the idler roller 70 can be moved towards or away from the drive roller 72.

As illustrated in FIG. 4, a micro switch 76 is removably attached to the under side of the block 22 by bolts 77. The micro switch 76 is activated by a contact arm 78 which is biased by a spring 79 and, when actuated, closes the switch 76 to allow electrical energy to drive the motor 22. A cable 81 connects the switch 76 to the motor 22. In one embodiment, the switch 76 communicates with a wire feeder and supplys the motor with electricity to provide the weld current. As mentioned above, the speed control mechanism 34 is positioned just behind the motor 22. The speed control mechanism 34 includes a micro-controller 82, which is adjusted through a knob 84. The micro-controller 82 is, in turn, connected through a second cable 86 to a wire feeder (not shown) and/or the motor 22 for controlling the wire feed speed.

Figure 9:
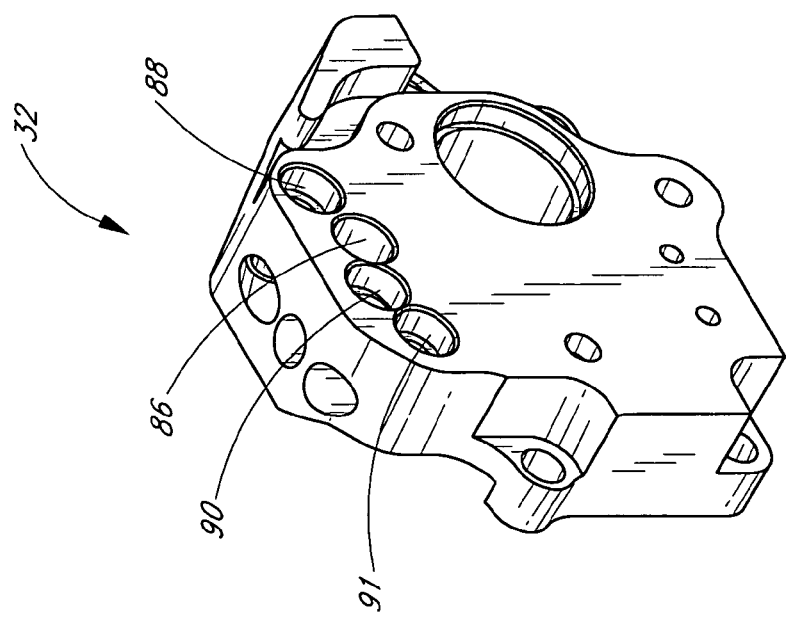
FIG. 9 is a rear perspective view of a motor mount of the welding gun of FIG. 1.

As shown in FIG. 9, the rear of the illustrated motor mount 32 has four bores 86, 88, 90, 91 which serve as the sites for connecting, respectively, a welding wire conduit 95 (see FIG. 4) through which the welding wire (not shown) is fed, a gas conduit 94, a cooling fluid conduit 92 (see FIG. 4), and a cooling fluid return conduit 96 (see FIG. 4). A power cable is electrically connected to the block 22. Current can then flow from the cable along the block 22 through the wire tube 48, the torch barrel 23 and the torch barrel assembly 24 to the contact tip 46. An arc forms between the tip of the wire and the work piece. Thus, the current flows to the welding wire as it exits the welding tip assembly 16.

As seen in FIG. 4, the motor mount 32 includes a gas connector 98, a cooling fluid connector 100, and a cooling fluid return connector 101. These connectors 98, 100 fit into openings 102, 104, 105 formed in the rear of the block 22 (see FIG. 10). The wire conduit 95 extends through the motor mount 32 and is attached to a guide 103, which directs the wire between the driver and idler rollers 70, 72 and into the wire tube 48. The gas and cooling fluid openings 102, 104 open in to passages (not shown), which are formed in the block 22 and preferably extend below the drive and idler rollers 70, 72. These passages place the gas conduit 94 in communication with the gas tube 50 and the cooling fluid conduit 96 in communication with the cooling fluid tube 52.

With reference now to FIGS. 1-4, the casing 20 is preferably molded of a suitable plastic material that serves as both an electrical and heat insulator. The casing 20 is divided into two sections 20a and 20b which are essentially mirror images of one another and include a series of mounting sites 110 along their edges which allows the casing to be screwed together by screws 106 that are received in the mounting sites 110. The two sections 20a,b preferably also form interlocking lap joints 112 to facilitate a smooth fit. The sections 20a,b fit snugly around and cover the mounting block 22, motor 18, the speed control mechanism 80 and the barrel 24. As such, in the illustrated arrangement, the casing 20 terminates at its distal end at the gas cup 42 and at its proximal end behind the motor 18. At the distal end, the nut 44 secures the casing 20 around the torch barrel 24.

This casing 20 has a first opening 114 to provide access to the drive and idler rollers 72, 70. A door 116 is preferably covers the opening 114 and is attached to the casing by a hinge 117. A second opening 118 is provided at the proximal end of the handle 12 to allow access to the control knob 84 of the speed controller 80. A third opening 120 is provided for the lever 78.

The casing 20 electrically isolates the block 22 and the torch barrel 24. Advantageously, a repairman can easily disassemble the casing 20 to provide access to the internal components of the gun 10, which can then be tested and replaced if necessary. For example, if the touch barrel assembly 24 becomes damaged, the bolts 106 can be removed and the casing 20 can be separated into two halves 20a, 20b. In this manner, the repairman has access to all of the internal components of the welding gun. The torch barrel 24 can then be separated from the block 22 by removing the bolts 26 from the torch barrel mounting plate 28 and disconnecting the connectors 58, 60, 61 from the openings 62, 64, 63 in the block 22. A new or repaired torch barrel 24 can then be attached to the block 22 and the casing 20 can be reassembled.

Another advantage of the casing 20 is that it can be made by injection molding, which is relatively inexpensive. In addition, the casing 20 eliminates the risk of crushing the outer sheath 23 as can happen when compression molding is used as described above.

Yet another advantage of the illustrated arrangement is that because of the efficient positioning of the connectors 58, 60, 21, the outer sheath 23 can be enlarged without appreciably increasing the size, shape or weight of the welding gun 20. This allows more cooling fluid to be circulated through the torch barrel cavity 34 and permits the use of a larger welding tip assembly 16 that can utilize more amps. The illustrated arrangement also advantageously cools the entire length of the torch barrel assembly 24.

Figure 11:
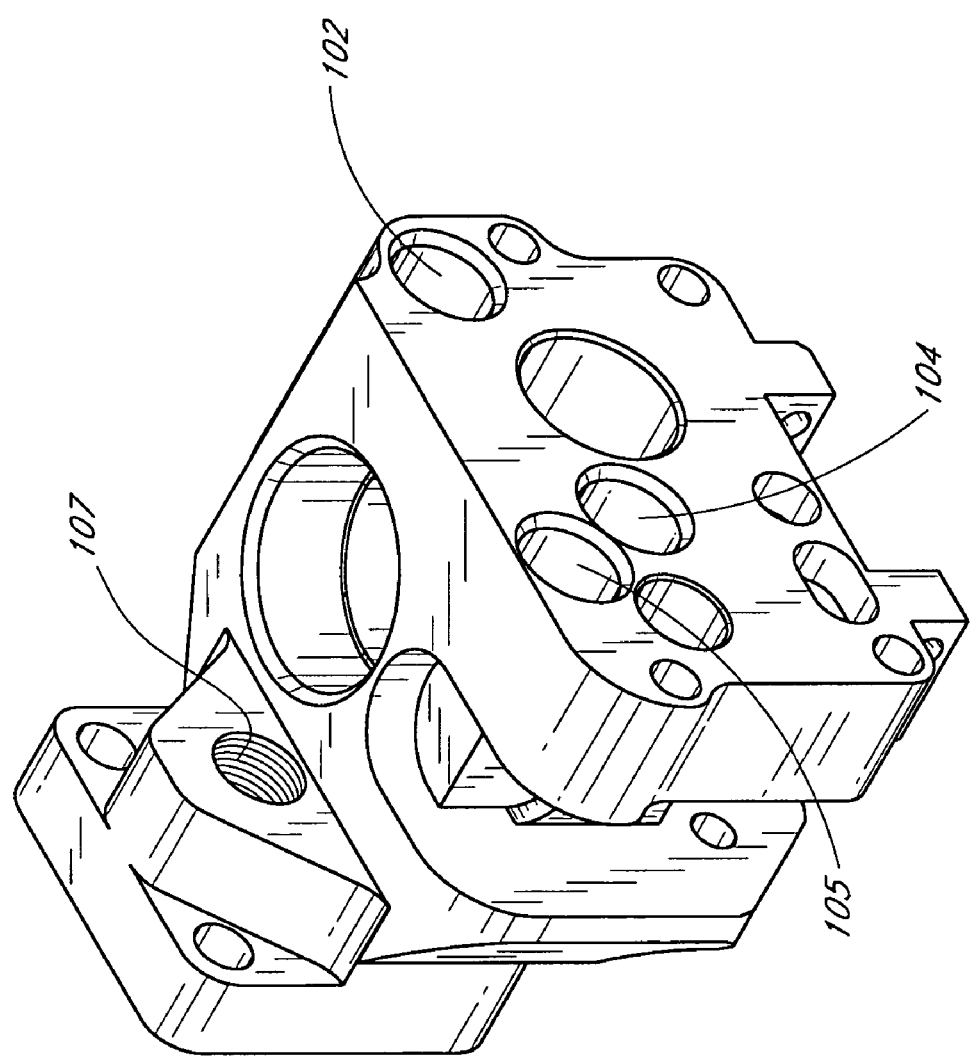
FIG. 11 is a view of an alternative embodiment of the block of FIG. 10.
Figure 21:
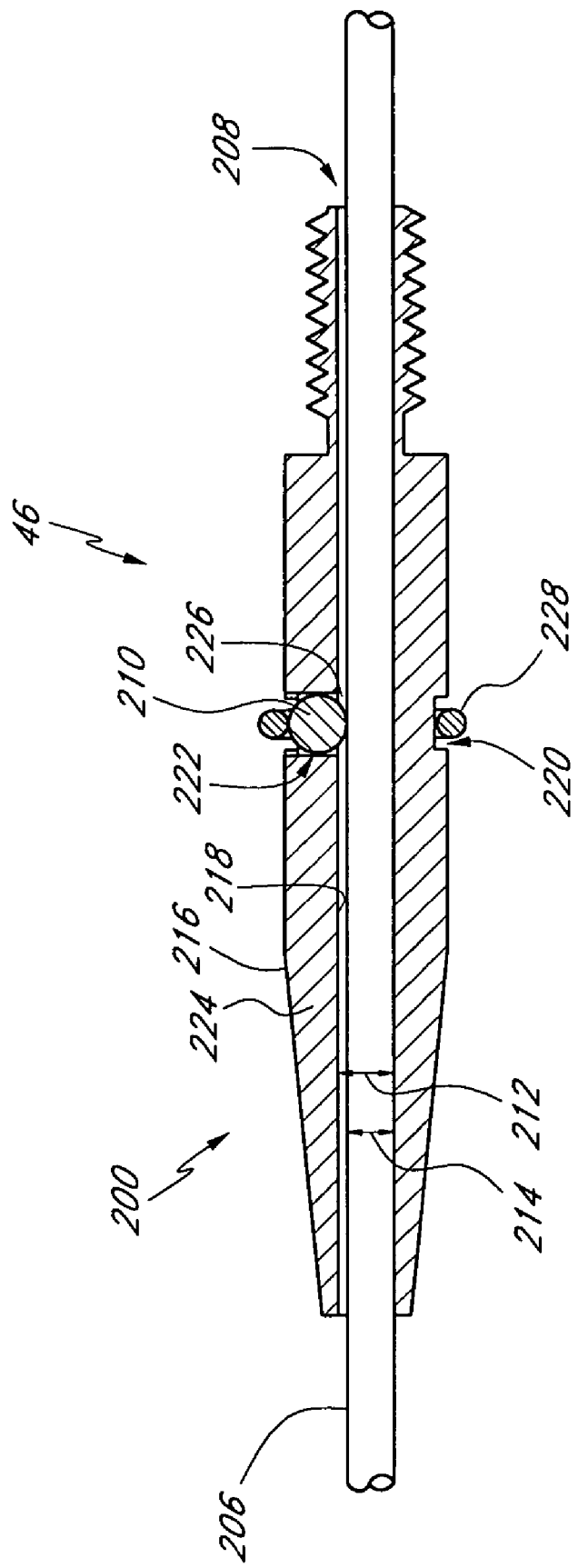
FIG. 21 is a cross-sectional view of the contact tip of FIG. 18, taken along line 21-21 of FIG. 18.
Figure 24:
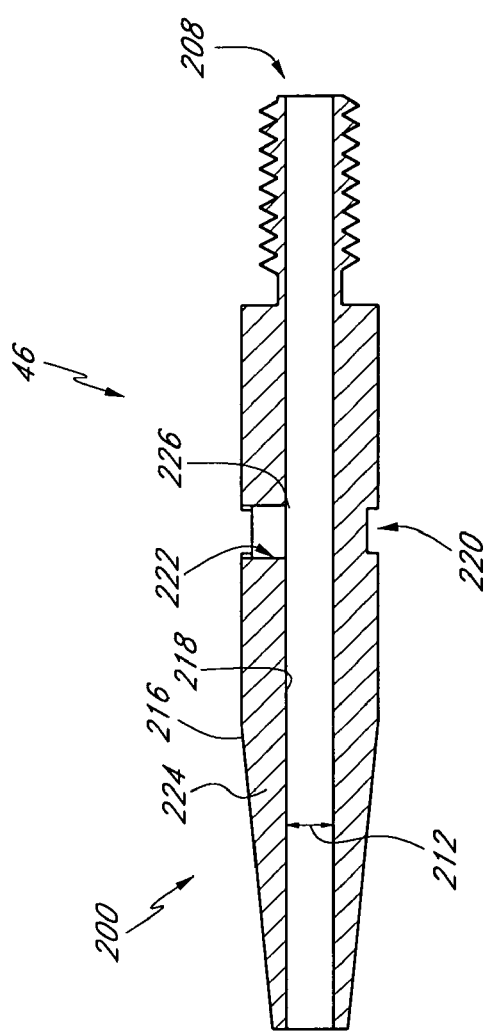
FIG. 24 is a cross-sectional view of the portion of the contact tip of FIG. 22, taken along line 24-24 of FIG. 22.

In another embodiment, illustrated in FIG. 11, the block 22 can be provided with threads 107 configured to be coupled with the threads of the contact tip 46. In some cases, the contact tip 46 can be long enough to extend back and be coupled directly with the block. In such cases, it may be advantageous to provide a welding gun without a torch barrel 23 or torch barrel assembly 24. Current can flow directly from the block 22 to the contact tip 46. The welding gun preferably comprises a gas cup.

With reference to FIGS. 12-14, in one embodiment the contact tip 46 is long enough to extend back and be coupled directly with the block 22. The welding gun of FIGS. 1-4 can be used to provide features and advantages similar to the features described herein, except that the contact tip 46 is directly coupled with the block 22. The welding gun preferably comprises a gas cup.

With reference to FIGS. 15-17, in another embodiment the contact tip 46 is similar to the contact tip described above with reference to FIGS. 12-14, except that the contact tip 46 has a first portion 46a and a second portion 46b. The first portion 46a is coupled with the block 22 to provide a consistent current flow. The second portion 46b is coupled to the first portion 46a by any suitable means to provide consistent contact. Threads 46e can he provided to couple the first and second portions 46a,b of the contact tip 46.

Although the invention has been disclosed in the context of certain preferred embodiments and examples, it will be understood by those skilled in the art that the present invention extends beyond the specifically disclosed embodiments to other alternative embodiments and/or uses of the invention and obvious modifications and equivalents thereof. In addition, while a number of variations of the invention have been shown and described in detail, other modifications, which are within the scope of this invention, will be readily apparent to those of skill in the art based upon this disclosure. It is also contemplated that various combination or sub-combinations of the specific features and aspects of the embodiments may be made and still fall within the scope of the invention. Accordingly, it should be understood that various features and aspects of the disclosed embodiments can be combine with or substituted for one another in order to form varying modes of the disclosed invention. Thus, it is intended that the scope of the present invention herein disclosed should not be limited by the particular disclosed embodiments described above, but should be determined only by a fair reading of the claims that follow.

What is claimed is:

1. A contact tip for a welding gun comprising:
an elongate body having a first end, a second end, an outer surface, an inner surface defining a first opening extending longitudinally between the first end and the second end, the first opening being configured to receive a weld wire, and a second opening communicating with the first opening, the second opening extending between the outer surface and the inner surface, the second opening being configured to receive a contact element;
a contact element configured to be simultaneously positioned at least partially within the second opening and at least partially within the first opening; and
a retention member configured to couple the contact element with the elongate body, the retention member comprising an elastomeric continuous ring configured to surround the elongate body and having a generally circular cross-sectional shape in a radial direction.

2. The contact tip of claim 1 wherein the retention member has an annular shape.

3. The contact tip of claim 1 wherein the retention member has a toroidal shape.

4. The contact tip of claim 1 wherein the retention member comprises an O-ring.

5. The contact tip of claim 1 wherein the retention member comprises an elastic material.

6. The contact tip of claim 1 wherein the contact element has a generally spherical shape.

7. The contact tip of claim 1 wherein the contact element comprises a rod.

8. The contact tip of claim 1 wherein the contact element comprises a composite material.

9. A contact tip for a welding gun comprising:
an elongate body having a first end, a second end, an outer surface, an inner surface defining a first opening extending longitudinally between the first end and the second end, the first opening being configured to receive a weld wire, and a second opening communicating with the first opening, the second opening extending between the outer surface and the inner surface, the second opening being configured to receive a contact element;

a contact element configured to be simultaneously positioned at least partially within the second opening and at least partially within the first opening; and a retention member configured to couple the contact element with the elongate body, the retention member comprising an elastomeric material forming a continuous ring for surrounding the elongate body, the ring having a circular cross-section in a radial direction.

10. The contact tip of claim 9 wherein the retention member has an annular shape.

11. The contact tip of claim 9 wherein the retention member has a toroidal shape.

12. The contact tip of claim 9 wherein the retention member comprises an O-ring.

13. The contact tip of claim 9 wherein the retention member comprises rubber.

14. The contact tip of claim 9 wherein the retention member comprises plastic.

15. The contact tip of claim 9 wherein the retention member comprises silicon.

16. The contact tip of claim 9 wherein the contact element comprises a composite material.

17. The contact tip of claim 9 wherein the contact element has a generally spherical shape.

18. The contact tip of claim 9 wherein the contact element comprises a rod.

19. The contact tip of claim 9 wherein the contact element elongate body comprises a groove extending circumferentially about the elongate body and configured to receive the elastomeric retention member during use.

20. A contact tip for a welding gun comprising:

an elongate body having a first end, a second end, an outer surface, an inner surface defining a first opening extending longitudinally between the first end and the second end, the first opening being configured to receive a weld wire, a second opening communicating with the first opening, the second opening extending between the outer surface and the inner surface, the second opening being configured to receive a contact element, and a groove defined in the elongate body;

a contact element configured to be simultaneously positioned at least partially within the second opening and at least partially within the first opening; and a retention member configured to couple the contact element with the elongate body, the retention member comprising an elastomeric continuous ring configured to surround the elongate body, having a generally circular cross-sectional shape in a radial direction, and being configured to be self-centering within the groove over the second opening for directing a retention force transverse to a surface of a weld wire.

21. The contact tip of claim 20 wherein the retention member comprises an O-ring.

22. The contact tip of claim 20 wherein the retention member has a generally circular cross-sectional area.

23. The contact tip of claim 20, wherein the groove is positioned on the back half of the elongate body.

24. The contact tip of claim 20, wherein the groove is positioned on the back third of the elongate body.

25. The contact tip of claim 20, wherein the groove is positioned on the back fourth of an exposed portion of the elongate body.

* * * * *